US010493563B2

(12) United States Patent
Umeyama et al.

(10) Patent No.: US 10,493,563 B2
(45) Date of Patent: Dec. 3, 2019

(54) METHOD OF MANUFACTURING SEALED BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Hiroshi Takamatsu, Moriguchi (JP); Hiroaki Imanishi, Moriguchi (JP)

(73) Assignee: TOYOTA JIDOSHA KABUSHIKI KAISHI, Toyota-shi, Aichi-ken (JP)

( * ) Notice: Subject to any disclaimer, the term of this patent is extended or adjusted under 35 U.S.C. 154(b) by 595 days.

(21) Appl. No.: 15/264,018

(22) Filed: Sep. 13, 2016

(65) Prior Publication Data

US 2017/0077544 A1 Mar. 16, 2017

(30) Foreign Application Priority Data

Sep. 16, 2015 (JP) ................. 2015-183175

(51) Int. Cl.
*B23K 26/20* (2014.01)
*H01M 2/04* (2006.01)
*H01M 10/04* (2006.01)
*H01M 2/36* (2006.01)
*B23K 101/36* (2006.01)

(52) U.S. Cl.
CPC ......... *B23K 26/206* (2013.01); *H01M 2/0426* (2013.01); *H01M 2/0434* (2013.01); *H01M 10/0404* (2013.01); *H01M 10/0431* (2013.01); *B23K 2101/36* (2018.08); *H01M 2/365* (2013.01)

(58) Field of Classification Search
CPC ............ B23K 26/206; B23K 2101/36; H01M 2/0426; H01M 2/0404; H01M 2/043; H01M 2/0434; H01M 2/0439; H01M 2/365; H01M 10/0404; H01M 10/0431
See application file for complete search history.

(56) References Cited

U.S. PATENT DOCUMENTS

| 6,627,348 B1 | 9/2003 | Haraguchi et al. |
| 2011/0067448 A1 | 3/2011 | Matsumoto et al. |
| 2011/0240613 A1 | 10/2011 | Hosokawa et al. |

FOREIGN PATENT DOCUMENTS

| JP | 2004-63406 A | 2/2004 |
| JP | 2009-23194 A | 2/2009 |
| JP | 2009-245758 A | 10/2009 |
| JP | 2011-212711 A | 10/2011 |
| WO | 2009/150976 A1 | 12/2009 |

*Primary Examiner* — Christopher S Kim
(74) *Attorney, Agent, or Firm* — Sughrue Mion, PLLC

(57) ABSTRACT

A method of manufacturing a sealed battery includes a welding step of forming a welded portion, and the welding step includes a first step of sequentially forming a plurality of weld beads in an opening edge portion and an outer peripheral edge portion such that the plurality of weld beads are spaced apart from one another, and a second step of forming a weld bead in each gap portion located between the weld beads, with a plurality of gap portions being formed in the opening edge portion and the outer peripheral edge portion.

1 Claim, 24 Drawing Sheets

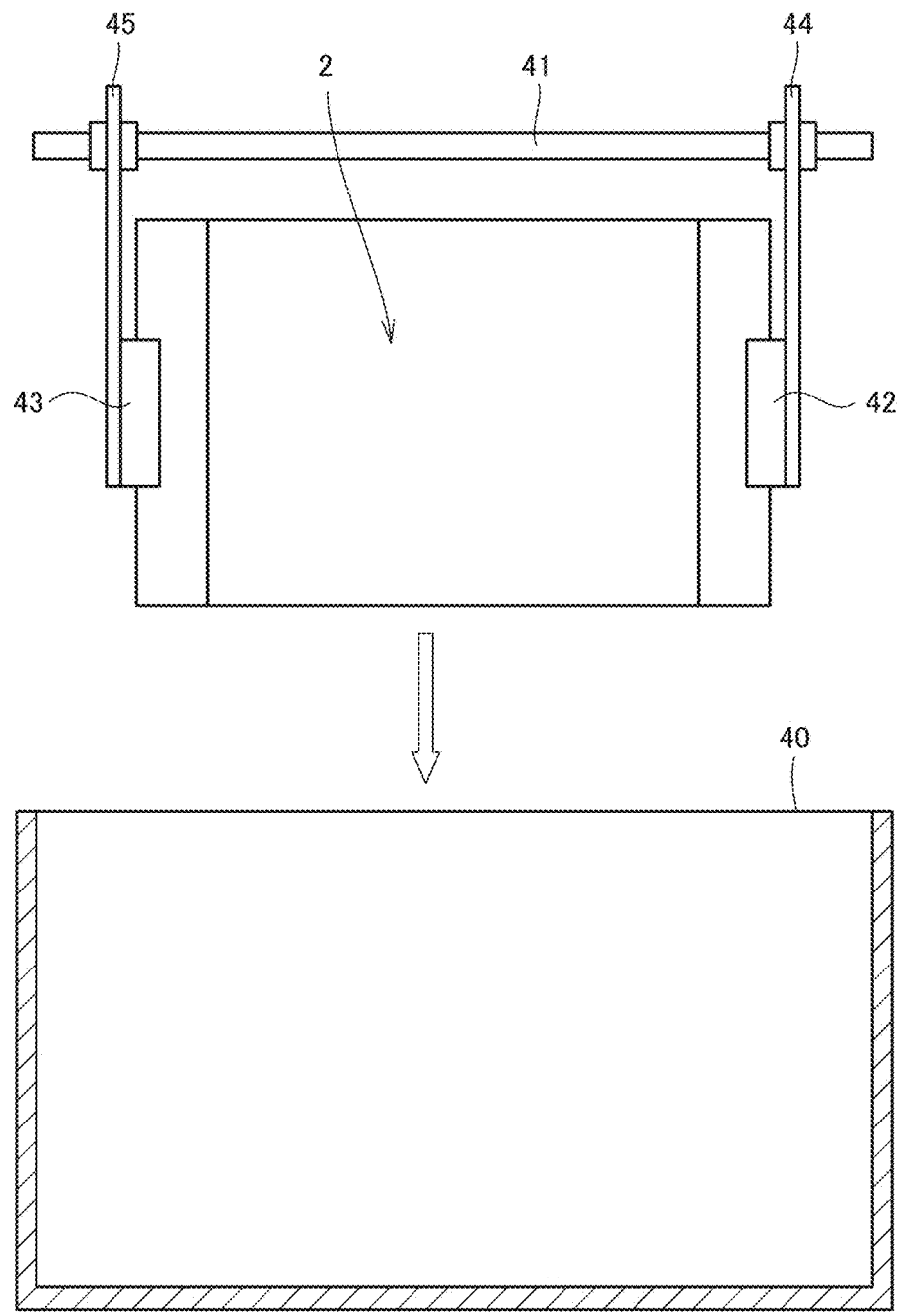

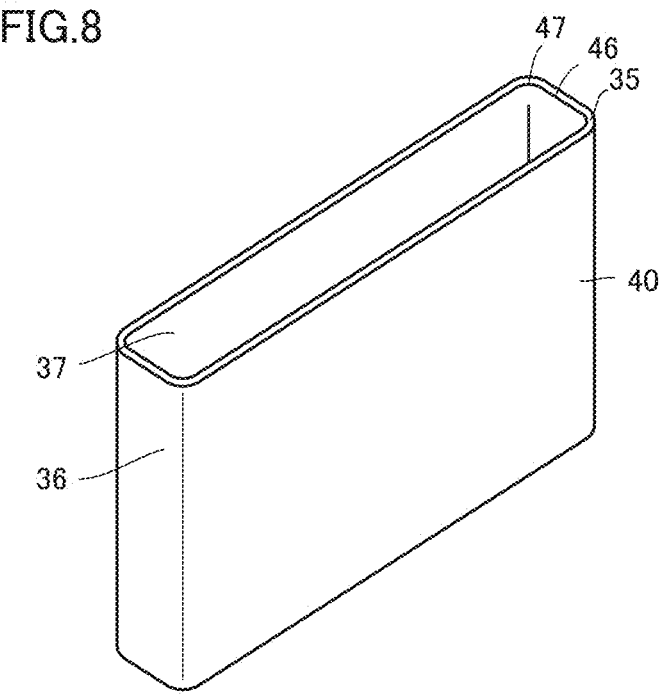
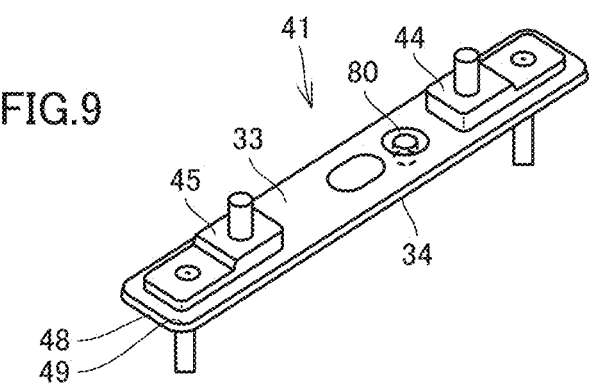

METHOD OF MANUFACTURING SEALED BATTERY

This nonprovisional application is based on Japanese Patent Application No. 2015-183175 filed on Sep. 16, 2015 with the Japan Patent Office, the entire contents of which are hereby incorporated by reference.

BACKGROUND OF THE INVENTION

Field of the Invention

The disclosure relates to a method of manufacturing a sealed battery.

Description of the Background Art

A sealed battery includes an electrode body and a housing case for housing the electrode body, and the housing case is formed by welding a lid to a case body having an opening. In recent years, from the perspective of shortening the manufacturing time, continuous welding with a continuous wave-type laser welder has been under study.

When continuous welding is performed with a laser beam, fumes are generated from a welded part, and the laser beam may interfere with particles of the fumes or may be diffused by the particles. When the laser beam is diffused, the laser beam does not reach the welded portion. As a result, a sufficient melting depth cannot be obtained, which may lead to poor welding.

Japanese Patent Laying-Open No. 2009-245758 suggests several methods for suppressing the aforementioned influence of the fumes.

As one of the manufacturing methods described in Japanese Patent Laying-Open No. 2009-245758, a method of repeating a low laser scanning speed and a high laser scanning speed is described. As another manufacturing method, a method of performing laser scanning over the length of 0.8 mm at a prescribed scanning speed, and thereafter, returning by 0.2 mm from a stop position and performing laser scanning again over the length of 0.8 mm is described.

In addition, Japanese Patent Laying-Open No. 2011-212711 describes a method of emitting a laser beam in a pulsed manner in a welding start region and a welding end region, and emitting a laser beam in a continuous manner in a region between the start region and the end region.

SUMMARY OF THE INVENTION

Even in the method of repeating the low laser scanning speed and the high laser scanning speed, fumes are generated from the position irradiated with the laser beam. In both the case of the laser scanning speed being low and the case of the laser scanning speed being high, the emitted laser beam passes through the fumes. As a result, a penetration depth of a weld bead becomes insufficient.

In the method of performing scanning over the length of 0.8 mm and thereafter returning by 0.2 mm, an overlap portion is continuously irradiated with the laser beam twice and an amount of fumes increases. Therefore, the emitted laser beam is easily affected by the fumes.

Even when the laser beam is emitted in a pulsed manner as described in Japanese Patent Laying-Open No. 2011-212711, the laser beam is emitted at short intervals and thus the time sufficient for diffusing the fumes cannot be ensured. If irradiation is stopped until the fumes are diffused, the processing time becomes very long.

The disclosure has been made in view of the above-described problem and an object of the disclosure is to provide a method of manufacturing a sealed battery in which an influence of fumes on a laser beam can be suppressed and an increase in processing time can be suppressed.

A method of manufacturing a sealed battery described herein is a method of manufacturing a sealed battery including a case formed by welding a lid and a case body having an opening with a laser beam, and an electrode body housed in the case. The method of manufacturing a sealed battery includes: arranging the lid in the opening of the case body; and forming a welded portion connecting an opening edge portion of the case body and an outer peripheral edge portion of the lid. Forming the welded portion includes: sequentially forming a plurality of first weld beads in the opening edge portion and the outer peripheral edge portion such that the plurality of first weld beads are spaced apart from one another; and forming a second weld bead in each gap portion located between the first weld beads, with a plurality of gap portions being formed in the opening edge portion and the outer peripheral edge portion.

According to the method of manufacturing a sealed battery, forming the second weld bead is repeatedly performed until each of the gap portions is filled with the second weld bead.

According to the method of manufacturing a sealed battery, lengths of the first weld bead and the second weld bead are set to be within a range of equal to or longer than 2 mm and equal to or shorter than 12 mm, and when the lengths of the first weld bead and the second weld bead are set to be within a range of longer than 8 mm and equal to or shorter than 12 mm, the lengths of the first weld bead and the second weld bead are set to become shorter as a processing speed becomes lower.

According to the manufacturing method described above, the lengths of the first weld bead and the second weld bead are set to be within a range of equal to or longer than 2 mm and equal to or shorter than 12 mm, and when the lengths of the first weld bead and the second weld bead are set to be within a range of longer than 8 mm and equal to or shorter than 12 mm, the lengths of the first weld bead and the second weld bead are set to become shorter as the processing speed becomes lower.

Therefore, the fumes generated during formation of the first weld bead can be reduced. Since the generation of the fumes can be suppressed, diffusion and reflection, by the fumes, of the laser beam emitted during formation of the first weld bead can be suppressed and the weld bead having an excellent welding depth can be formed. When the length of the first weld bead is shorter than 2 mm, the emitted laser beam becomes a pulsed laser beam, which makes it difficult to form the first weld bead having a sufficient melting depth.

When the first weld bead having a length equal to or longer than 12 mm is formed, a large amount of fumes are generated even if the processing speed is increased, which may lead to poor welding.

When the processing speed is decreased, the time required for forming one first weld bead becomes longer and a large amount of fumes are likely to be generated. Thus, when the length of the first weld bead is set to be longer than 8 mm and equal to or shorter than 12 mm, the length of the first weld bead is set to become shorter as the processing speed becomes lower, to thereby suppress the generation of a large amount of fumes.

When the length of the first weld bead is within a range of equal to or longer than 2 mm and equal to 8 mm, an excessive amount of fumes are not generated during formation of one first weld bead, and thus, the laser beam can be emitted excellently.

When one first weld bead is formed and then a next first weld bead is formed, spacing corresponding to approximately the length of the subsequently-formed second weld bead is provided. Therefore, a distance between the first weld beads is substantially equal to or longer than 2 mm, and thus, the next first weld bead can be formed with a suppressed influence of the fumes generated during formation of the one first weld bead.

Since the plurality of first weld beads are formed in the opening edge portion of the case body and the outer peripheral edge portion of the lid to be spaced apart from one another, the plurality of gap portions are formed in the opening edge portion and the outer peripheral edge portion.

Then, the second weld bead is formed in the gap portion. Since the length of this second weld bead is also set to be a prescribed length, the second weld bead can also be excellently formed similarly to the first weld bead.

The second weld beads are sequentially formed in the respective gap portions. Therefore, for example, when the second weld bead is formed in one gap portion, the new second weld bead is formed in the next gap portion. Thus, the first weld bead is at least located between the second weld bead and the new second weld bead.

The length of the first weld bead is set to be a prescribed length. Therefore, a distance between the second weld beads is substantially equal to or longer than 2 mm. Thus, absorption or diffusion of the laser beam emitted to form the new second weld bead by the fumes generated during formation of the immediately preceding second weld bead can be suppressed.

When each gap portion can be filled by forming one second weld bead in each gap portion, the step of forming the second weld bead is not repeated. On the other hand, when each gap portion is not filled after one second weld bead is formed in each gap portion, the step of forming the second weld bead is performed again.

The first weld beads and the second weld beads are formed as described above, and thus, a welded portion having an excellent welding depth can be formed. Furthermore, the first weld bead and the second weld bead have the prescribed lengths, and thus, an increase in processing time is suppressed.

According to the method of manufacturing a sealed battery, the laser beam is output from a laser welding device. The laser welding device forms the first weld bead by emitting the laser beam to a position on the case body apart from the opening edge portion or a position on the lid apart from the outer peripheral edge portion, and then, moving a position irradiated with the laser beam toward the opening edge portion and the outer peripheral edge portion, and moving the irradiated position on the opening edge portion and on the outer peripheral edge portion when the irradiated position reaches the opening edge portion and the outer peripheral edge portion.

According to the method of manufacturing a sealed battery described above, the metal and the like at the irradiated position are melted a little at the start of emission of the laser beam. On the other hand, the metal and the like cannot be melted sufficiently enough for welding the objects to be welded. Therefore, the metal and the like melted by the laser beam drop from the irradiated position, and the metal and the like at the irradiated position become thinner. When the laser beam is subsequently emitted again to the aforementioned start point in order to connect a new weld bead, excellent welding cannot be achieved because the metal and the like are thin.

Thus, as described above, when the first weld bead is formed, the start position is located at the position apart from the opening edge portion of the case body or the outer peripheral edge portion of the lid. During movement of the irradiated position to the opening edge portion and the outer peripheral edge portion after the start of emission of the laser beam, a sufficient melting depth is obtained. Then, with the sufficient melting depth having been obtained, the irradiated position is moved on the opening edge portion and on the outer peripheral edge portion. Thus, the opening edge portion and the outer peripheral edge portion can be welded excellently.

The foregoing and other objects, features, aspects and advantages of the disclosure will become more apparent from the following detailed description of the disclosure when taken in conjunction with the accompanying drawings.

BRIEF DESCRIPTION OF THE DRAWINGS

FIG. 7 is a schematic view showing an overview of a preparation step P1.

FIG. 8 is a perspective view showing a case body 40.

FIG. 9 is a perspective view showing a lid 41.

DESCRIPTION OF THE PREFERRED EMBODIMENTS

First Embodiment

Figure 1:
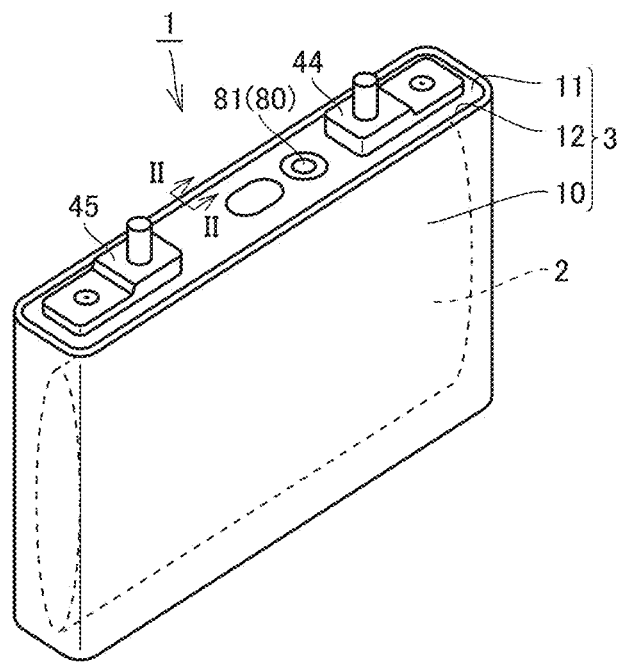
FIG. 1 is a perspective view showing a sealed battery 1 according to a first embodiment.

FIG. 1 is a perspective view showing a sealed battery 1 according to a first embodiment. As shown in this FIG. 1, sealed battery 1 includes an electrode body 2 and a housing case 3 for housing electrode body 2 therein.

Electrode body 2 includes a wound body around which a positive electrode sheet, a negative electrode sheet and a separator stacked sequentially are wound, a positive electrode collector portion connected to a positive electrode portion formed in the wound body, and a negative electrode collector portion connected to a negative electrode portion formed in the wound body.

Housing case 3 includes a case body 10, a lid 11 welded to case body 10, and a welded portion 12 for welding case body 10 and lid 11. Lid 11 includes a positive electrode terminal 44 and a negative electrode terminal 45 provided on an upper surface of lid 11, and a closing member 81 for closing an injection port 80 formed in the upper surface of lid 11. Welded portion 12 is formed between an outer peripheral edge portion of lid 11 and an inner peripheral edge portion of case body 10, and is continuously annularly formed.

Figure 2:
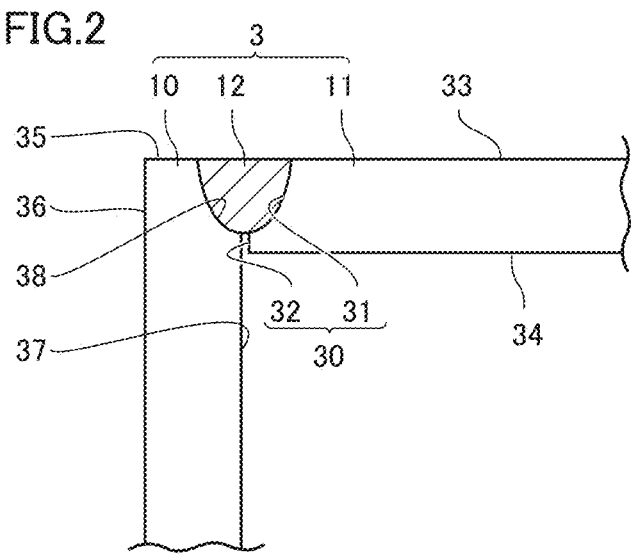
FIG. 2 is a cross-sectional view taken along line II-II shown in FIG. 1.

FIG. 2 is a cross-sectional view taken along line II-II shown in FIG. 1. As shown in this FIG. 2, lid 11 and case body 10 are welded by welded portion 12 and a peripheral surface of welded portion 12 is formed to have a substantially curved surface shape.

Lid 11 includes an upper surface 33, a lower surface 34 and an outer peripheral surface 30. Outer peripheral surface 30 includes a boundary surface 31 connected to upper surface 33, and a remaining surface 32 formed to connect boundary surface 31 and lower surface 34.

Boundary surface 31 is formed to be curved along the shape of welded portion 12. Remaining surface 32 is a portion of the outer peripheral surface of the lid that remains without being melted as described below.

Case body 10 includes an upper surface 35, an outer surface 36, an inner surface 37, and a boundary surface 38. Boundary surface 38 is formed to connect upper surface 35 and inner surface 37, and boundary surface 38 is also formed to have a curved surface shape along the shape of welded portion 12.

Figure 3:
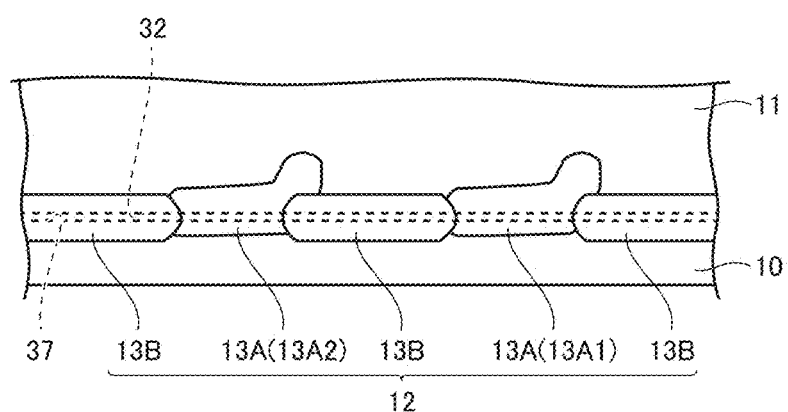
FIG. 3 is a plan view showing a configuration of a welded portion 12 and surroundings thereof.

FIG. 3 is a plan view showing a configuration of welded portion 12 and surroundings thereof. As shown in this FIG. 3, welded portion 12 is formed by connecting a plurality of weld beads 13A and 13B to one another. When each weld bead 13A, 13B is viewed in a planar view from above housing case 3, each weld bead 13A, 13B is formed to extend across remaining surface 32 of lid 11 and inner surface 37 of case body 10.

Figure 4:
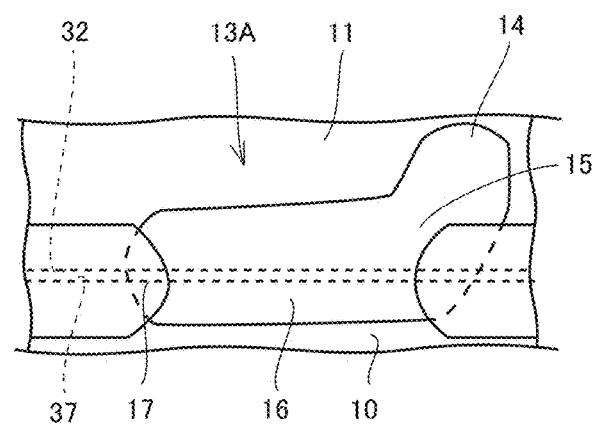
FIG. 4 is a plan view showing a configuration of a weld bead 13A and surroundings thereof.

FIG. 4 is a plan view showing a configuration of weld bead 13A and surroundings thereof. As shown in this FIG. 4, weld bead 13A includes an end 14 formed on lid 11, an extending portion 15 extending toward remaining surface 32 and inner surface 37, a main body portion 16 connected to extending portion 15 and extending in the extending direction of remaining surface 32 and inner surface 37, and an end 17 located at a tip of main body portion 16. End 17 is also formed to extend across remaining surface 32 and inner surface 37.

Figure 5:
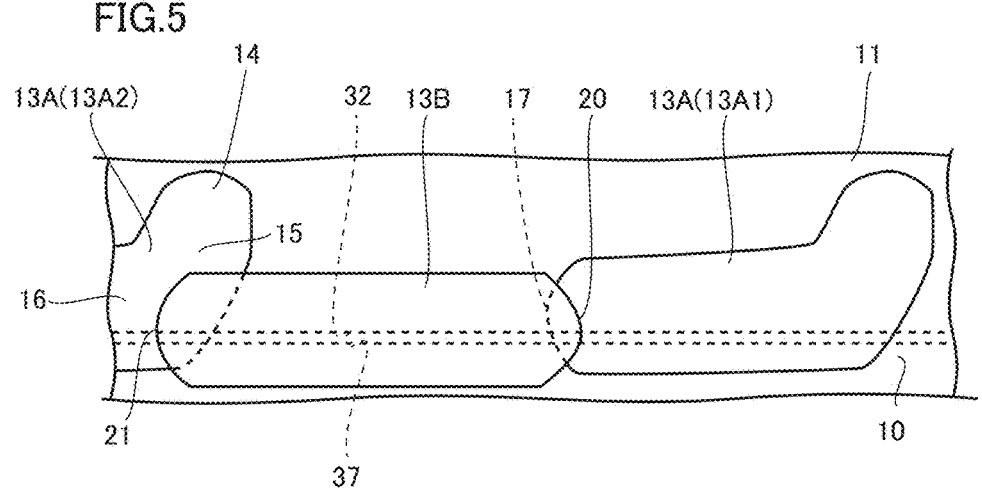
FIG. 5 is a plan view showing a weld bead 13B and surroundings thereof.

FIG. 5 is a plan view showing weld bead 13B and surroundings thereof. As shown in this FIG. 5, weld bead 13B is formed to extend across remaining surface 32 and inner surface 37, and is formed in an elongated manner in the extending direction of remaining surface 32 and inner surface 37.

A weld bead 13A1 and a weld bead 13A2 are formed at positions adjacent to this weld bead 13B, and weld bead 13B is formed on weld bead 13A1 and weld bead 13A2.

Specifically, one end 20 of weld bead 13B is formed on end 17 of weld bead 13A1. An end 21 of weld bead 13B is formed to overlap with the neighborhood of a portion connecting extending portion 15 and main body portion 16 of weld bead 13A2.

Therefore, a portion of lid 11 and case body 10 located between weld bead 13A1 and weld bead 13A2 is filled with weld bead 13B.

Weld beads 13A and weld beads 13B formed as described above are repeatedly formed, and as a result, case body 10 and lid 11 can be integrated excellently and electrode body 2 housed in housing case 3 can be sealed excellently.

Figure 6:
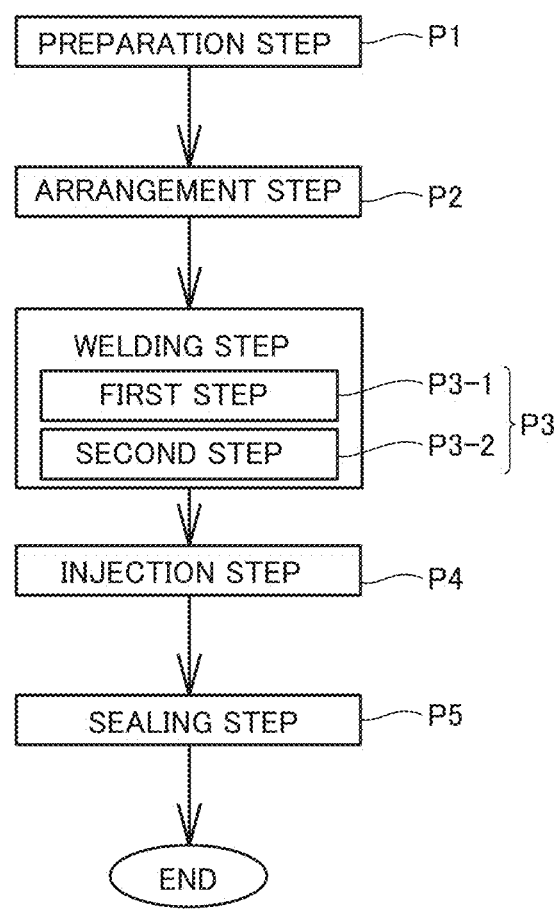
FIG. 6 is a flowchart showing a process of manufacturing sealed battery 1.

FIG. 6 is a flowchart showing a process of manufacturing sealed battery 1. As shown in this FIG. 6, the manufacturing process of manufacturing sealed battery 1 includes a preparation step P1, an arrangement step P2, a welding step P3, an injection step P4, and a sealing step P5.

FIG. 7 is a schematic view showing an overview of preparation step P1. In this FIG. 7, preparation step P1 includes a step of forming electrode body 2, and a step of connecting a positive electrode collector 42 and a negative electrode collector 43 to electrode body 2. Preparation step P1 further includes a step of preparing a lid 41, a step of connecting positive electrode terminal 44 of lid 41 and positive electrode collector 42 and connecting negative electrode terminal 45 of lid 41 and negative electrode collector 43, and a step of preparing a case body 40.

FIG. 8 is a perspective view showing case body 40. Case body 40 has an opening 46 in upper surface 35 and an opening edge portion 47 of opening 46 extends annularly.

FIG. 9 is a perspective view showing lid 41. In this FIG. 9, electrode body 2 connected to positive electrode terminal 44 and negative electrode terminal 45 is not shown.

As shown in this FIG. 9, lid 41 includes upper surface 33, lower surface 34, and an outer peripheral surface 48 extending annularly to connect upper surface 33 and lower surface 34, and a boundary portion between outer peripheral surface 48 and upper surface 33 is provided with an outer peripheral edge portion 49. Injection port 80 is formed in upper surface 33.

Figure 10:
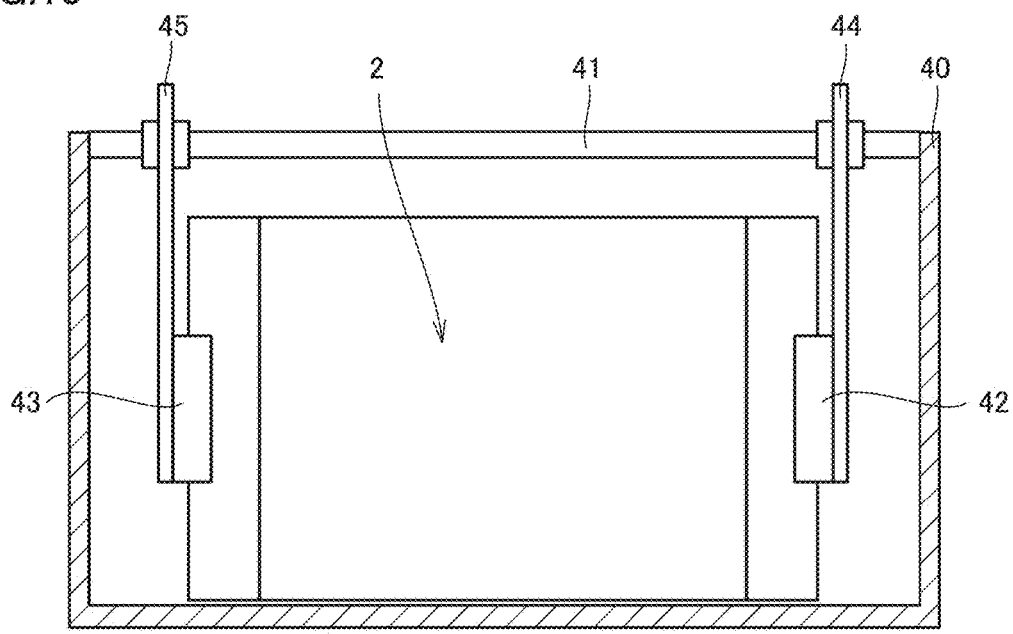
FIG. 10 is a partial cross-sectional view showing an arrangement step P2.

FIG. 10 is a partial cross-sectional view showing arrangement step P2. As shown in this FIG. 10, in arrangement step P2, lid 41 is arranged in opening 46 of case body 40. When lid 41 is arranged in opening 46, lid 41 is fitted into opening 46 by a device. A support portion may be formed on inner surface 37 of case body 40 to support lid 41. Prior to arrangement step P2, electrode body 2 is housed in case body 40.

Figure 11:
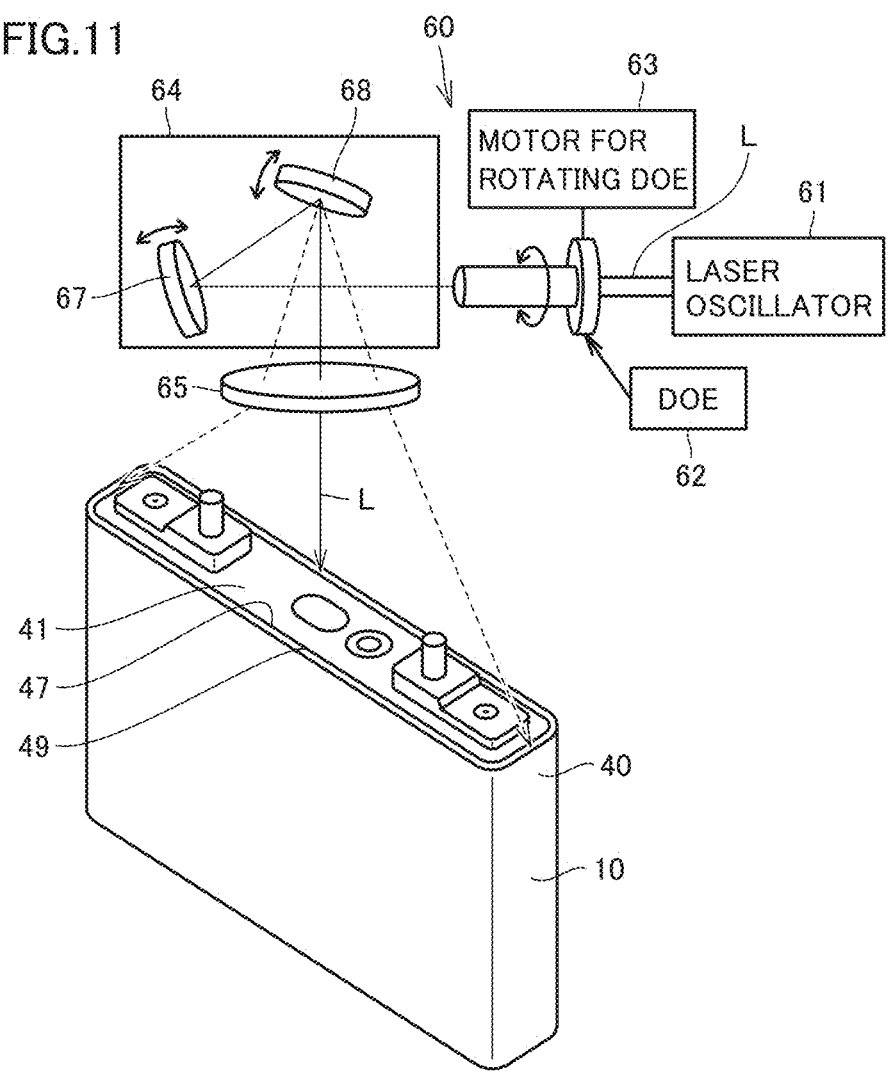
FIG. 11 is a schematic view schematically showing a welding step P3.

FIG. 11 is a schematic view schematically showing welding step P3. As shown in FIG. 11, by using a laser welding device 60, a laser beam is emitted to opening edge portion 47 of case body 40 and outer peripheral edge portion 49 of lid 41 to weld opening edge portion 47 and outer peripheral edge portion 49.

Laser welding device 60 is a galvanoscanner-type welding device. This laser welding device 60 includes a laser oscillator 61, an optical diffraction element 62, a motor for rotation 63, a galvanoscanner 64, and an fθ lens 65. A reflective mirror 67 and a reflective mirror 68 are provided in galvanoscanner 64.

Laser oscillator 61 generates a laser beam and the laser beam generated by laser oscillator 61 enters optical diffraction element 62 through an optical fiber. The laser beam having entered optical diffraction element 62 then enters galvanoscanner 64.

The laser beam having entered galvanoscanner 64 is reflected by reflective mirror 67 and reflective mirror 68, and enters fθ lens 65. The laser beam output from fθ lens 65 is collected at a prescribed focus position.

In this laser welding device 60, by adjusting reflective mirror 67 and reflective mirror 68, a position irradiated with a laser beam L can be adjusted. Furthermore, by adjusting fθ lens 65, the focus position of laser beam L can be adjusted.

Next, a process of forming welded portion 12 will be described with reference to FIG. 12 and the like. The process of forming welded portion 12 includes a first step P3-1 of forming a plurality of weld beads 13A in outer peripheral edge portion 49 and opening edge portion 47 such that the plurality of weld beads 13A are spaced apart from one another, and a second step P3-2 of forming weld bead 13B to close a gap portion formed between weld beads 13A, after forming weld beads 13A.

Second step P3-2 described above is repeatedly performed until the gap portion located between weld beads 13A is closed. However, in the first embodiment, the gap portion located between weld beads 13A is closed by performing second step P3-2 once. Therefore, second step P3-2 is performed only once.

Figure 12:
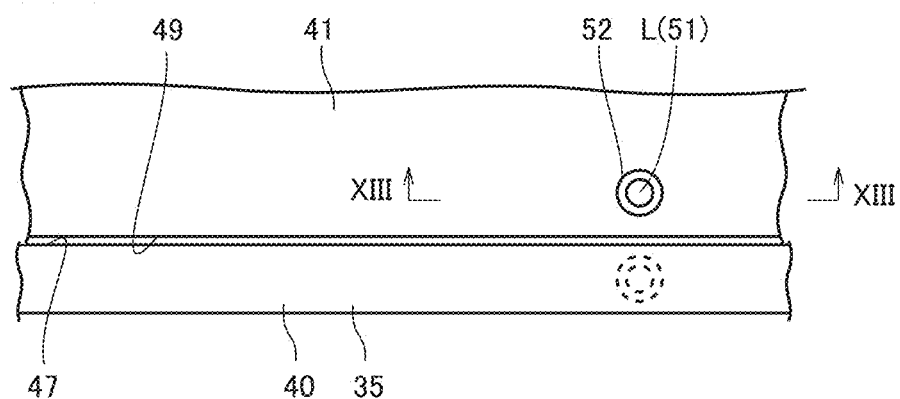
FIG. 12 is a plan view showing an initial step of a first step.
Figure 13:
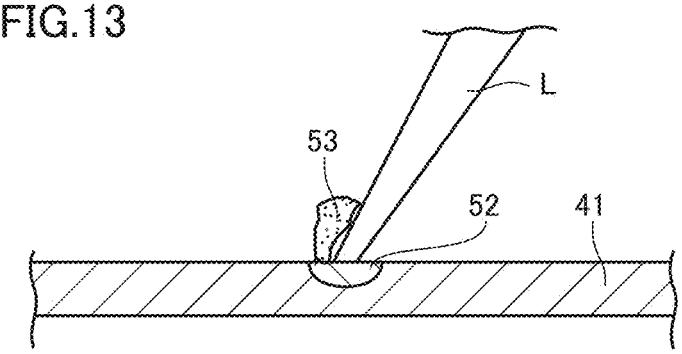
FIG. 13 is a cross-sectional view taken along line XIII-XIII in FIG. 12.

FIG. 12 is a plan view showing an initial step of first step P3-1, and FIG. 13 is a cross-sectional view taken along line XIII-XIII shown in FIG. 12.

In FIG. 12, when weld bead 13A is formed, laser beam L is first emitted to an initial position 51 on lid 41 apart from outer peripheral edge portion 49.

As shown in FIG. 13, when laser beam L is first emitted to lid 41, a surface of lid 41 is heated by laser beam L and a part of lid 41 is melted. At the time of first emission of laser beam L to lid 41, an amount of melted metal such as aluminum forming lid 41 is insufficient for welding lid 41 and case body 40.

If initial position 51 is located at outer peripheral edge portion 49 and opening edge portion 47, outer peripheral edge portion 49 and opening edge portion 47 cannot be sufficiently welded. Furthermore, the melted portion drops, and lid 41 and case body 40 become thinner. Therefore, when laser beam L is emitted again to initial position 51 at the time of formation of weld bead 13B, an amount of metal required for welding is not left, which results in poor welding. Thus, in the first embodiment, initial position 51 of laser beam L is located apart from outer peripheral edge portion 49 and opening edge portion 47.

In the example shown in FIG. 12, initial position 51 is located on lid 41. However, as shown by a dashed line in FIG. 12, initial position 51 may be located on upper surface 35 of case body 40. In this case, initial position 51 is located apart from opening edge portion 47.

As shown in FIGS. 12 and 13, when laser beam L is emitted to initial position 51, the metal around initial position 51 is melted to form a melted portion 52, and fumes 53 are generated from initial position 51.

Fumes 53 are fumes generated as a result of evaporation of the metal, and fine particles of a metal such as aluminum or fine particles of a metal compound such as aluminum oxide are included in fumes 53.

When fumes 53 enter an emission path of laser beam L, the laser beam is absorbed or diffused by the aforementioned fine particles. Therefore, when a large amount of fumes 53 enter the emission path of laser beam L, laser beam L is less likely to reach the weld metal, which may lead to poor welding.

On the other hand, when laser beam L is emitted to initial position 51, only a small amount of fumes 53 are generated, and thus, the above-described problem is less likely to occur.

Figure 14:
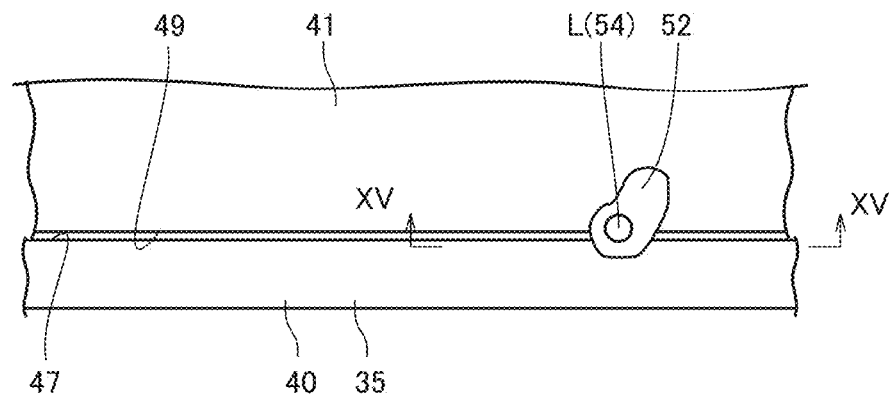
FIG. 14 is a plan view showing a step after the step shown in FIG. 12.
Figure 15:
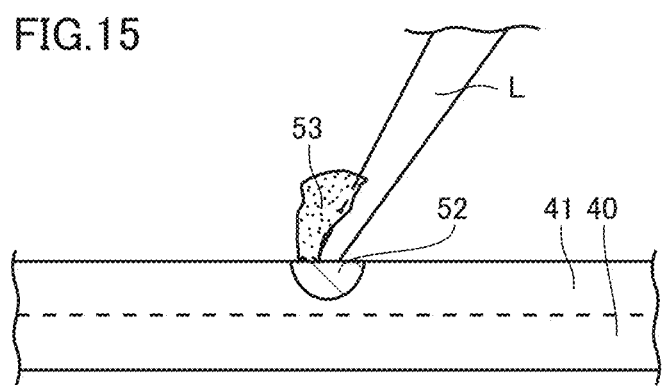
FIG. 15 is a cross-sectional view taken along line XV-XV in FIG. 14.

FIG. 14 is a plan view showing a step after the step shown in FIG. 12, and FIG. 15 is a cross-sectional view taken along line XV-XV in FIG. 14.

As shown in this FIG. 14, a position 54 irradiated with laser beam L is moved from initial position 51 toward outer peripheral edge portion 49 of lid 41 and opening edge portion 47 of case body 40. In this way, emission of laser beam L is continued during movement of irradiated position 54, and thus, the amount of melted metal forming case body 40 increases. With this, melted portion 52 also extends toward outer peripheral edge portion 49 and opening edge portion 47, and a melting depth of melted portion 52 becomes sufficiently deeper and a melting width becomes greater.

When irradiated position 54 reaches outer peripheral edge portion 49 and opening edge portion 47, the melting width is great enough for welding opening edge portion 47 and outer peripheral edge portion 49. In addition, the melting depth is deep enough for obtaining sufficient welding strength.

Fumes 53 also continue to be generated during movement from initial position 51 to irradiated position 54 shown in FIG. 14, while the time of movement from initial position 51 to irradiated position 54 shown in FIG. 14 is short. Therefore, generated fumes 53 hardly cause poor welding.

Figure 16:
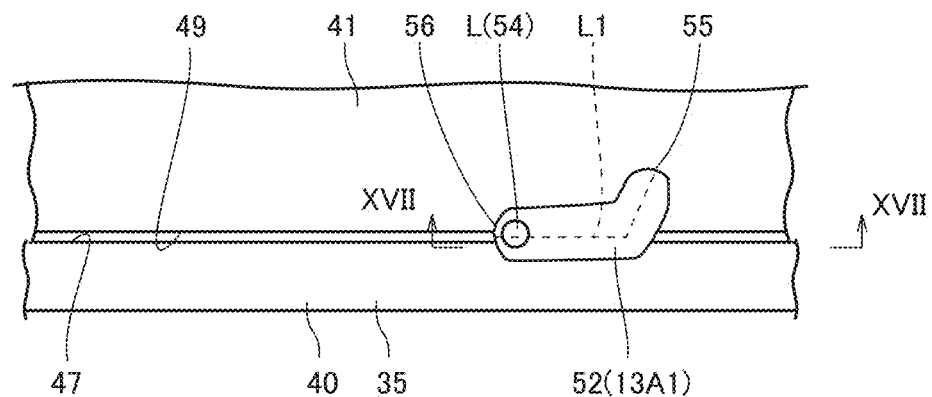
FIG. 16 is a plan view showing a step after the step shown in FIG. 14.
Figure 17:
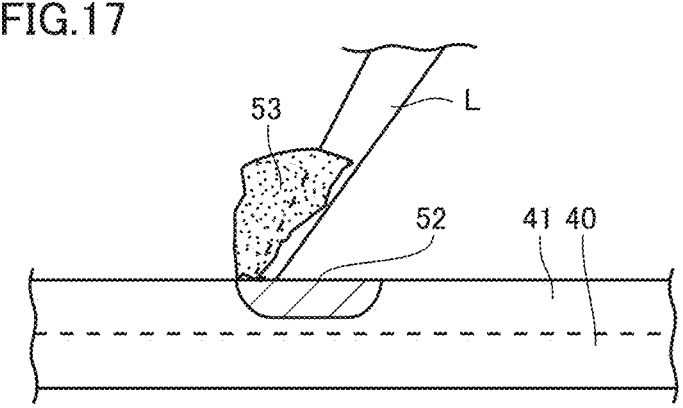
FIG. 17 is a cross-sectional view taken along line XVII-XVII shown in FIG. 16.

FIG. 16 is a plan view showing a step after the step shown in FIG. 14, and FIG. 17 is a cross-sectional view taken along line XVII-XVII shown in FIG. 16. As shown in FIG. 16, position 54 irradiated with laser beam L moves on opening edge portion 47 and on outer peripheral edge portion 49 in the extending direction of opening edge portion 47 and outer peripheral edge portion 49.

As a result, melted portion 52 is also formed on opening edge portion 47 and outer peripheral edge portion 49. Melted portion 52 thus formed cools and solidifies, and weld bead 13A1 is formed.

In FIG. 16, when the processing speed is 33 m/min, a length L1 (length from a start portion 55 to an end portion 56) of weld bead 13A1 can be set to be within a range of equal to or longer than 2 mm and equal to or shorter than 12 mm. When the processing speed is 21 m/min, the length of weld bead 13A1 can be set to be within a range of equal to or longer than 2 mm and equal to or shorter than 10 mm. When the processing speed is 9 m/min, the length of weld bead 13A1 can be set to be within a range of equal to or longer than 2 mm and equal to or shorter than 8 mm. The processing speed refers to the movement speed of position 54 irradiated with laser beam L.

Namely, length L1 of weld bead 13A1 from start portion 55 to end portion 56 can be set to be within a range of equal to or longer than 2 mm and equal to or shorter than 12 mm. When length L1 is set to be within a range of longer than 8 mm and equal to or shorter than 12 mm, length L1 is set to become shorter as the processing speed when forming weld bead 13A becomes lower. On the other hand, when length L1 of weld bead 13A1 is set to be within a range of equal to or longer than 2 mm and equal to or shorter than 8 mm, length L1 can be set regardless of the processing speed.

When length L1 of weld bead 13A1 in the laser processing direction is shorter than 2 mm, the emitted laser beam becomes a pulsed laser beam. As a result, it becomes difficult to obtain a welding depth sufficient for welding lid 41 and case body 40.

When weld bead 13A1 having length L1 equal to or longer than 12 mm is formed, a large amount of fumes are generated even if the processing speed is increased, which may result in poor welding.

When the processing speed is decreased, the time required for forming weld bead 13A1 becomes longer and a large amount of fumes are likely to be generated. Thus, when the length of weld bead 13A1 is set to be longer than 8 mm and equal to or shorter than 12 mm, the length of weld bead 13A1 is set to become shorter as the processing speed becomes lower, to thereby suppress the generation of a large amount of fumes.

On the other hand, when length L1 of weld bead 13A1 is set to be equal to or longer than 2 mm and equal to or shorter than 8 mm, the processing time does not become longer and generation of an excessive amount of fumes in the process of forming weld bead 13A1 can be suppressed.

Therefore, when laser beam L reaches irradiated position 54 shown in FIGS. 16 and 17, a large amount of fumes do not yet reach the emission path of the laser beam, and thus, opening edge portion 47 and outer peripheral edge portion 49 can be welded excellently.

After weld bead 13A1 is formed as described above, weld bead 13A2 is formed on the front side in the scanning direction of laser beam L with respect to weld bead 13A1.

Figure 18:
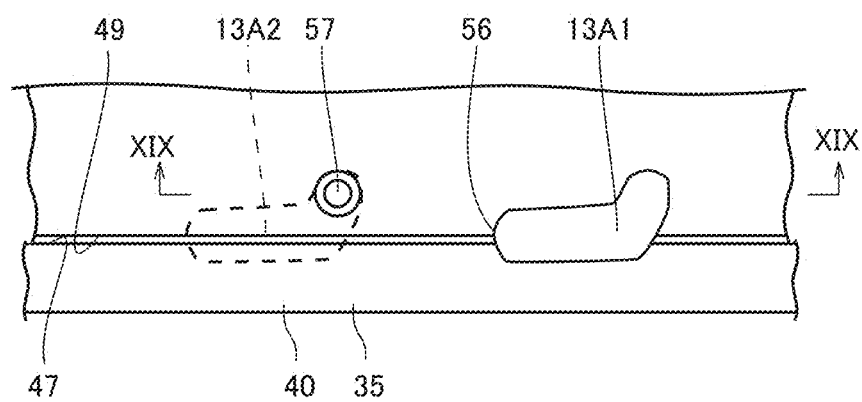
FIG. 18 is a plan view showing a step after the step shown in FIG. 16.
Figure 19:
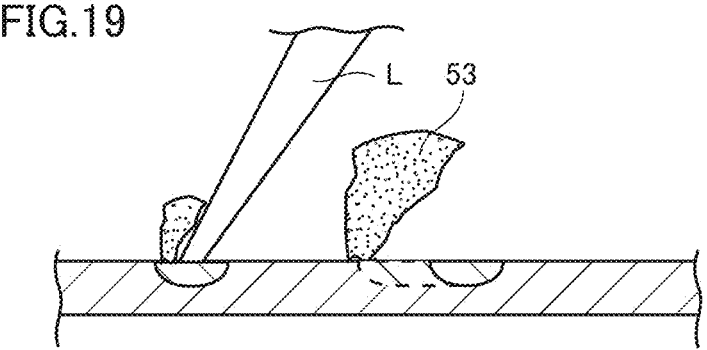
FIG. 19 is a cross-sectional view taken along line XIX-XIX in FIG. 18.

FIG. 18 is a plan view showing a step after the step shown in FIG. 16, and FIG. 19 is a cross-sectional view taken along line XIX-XIX in FIG. 18. As shown in this FIG. 18, laser beam L is emitted to a portion located at a start portion of weld bead 13A2. This initial position 57 is also a position apart from opening edge portion 47 and outer peripheral edge portion 49.

A distance between end portion 56 of weld bead 13A1 and initial position 57 is equal to or longer than 2 mm. Therefore, as shown in FIG. 19, interference of fumes 53 generated during formation of weld bead 13A1 with laser beam L emitted to initial position 57 is suppressed.

As described above, when weld bead 13A2 is formed, a distance of equal to or longer than 2 mm at minimum is provided between weld bead 13A2 and immediately preceding weld bead 13A1. On the other hand, the present inventors find that the spread width of the generated fumes is highly relevant to the length of formed weld bead 13A1. In order to reliably prevent the laser beam for forming new weld bead 13A2 from being affected by the already-generated fumes, the distance between new weld bead 13A2 and immediately preceding weld bead 13A1 is preferably equal to or greater than 60% of length L1 of immediately preceding weld bead 13A1.

When the irradiated position is changed from irradiated position 54 shown in FIG. 16 to initial position 57, emission of the laser beam is stopped. In addition, the movement speed from irradiated position 54 to initial position 57 is much higher than the processing speed of laser beam L during welding, and thus, almost no time is required for changing the irradiated position from irradiated position 54 to initial position 57. Therefore, even when the weld beads are formed to be spaced apart from one another, an increase in welding time is suppressed.

Figure 20:
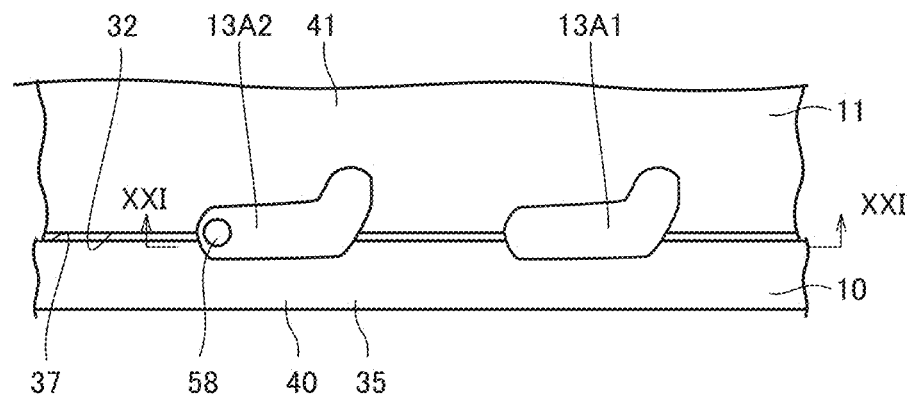
FIG. 20 is a plan view showing a step after the step shown in FIG. 18.
Figure 21:
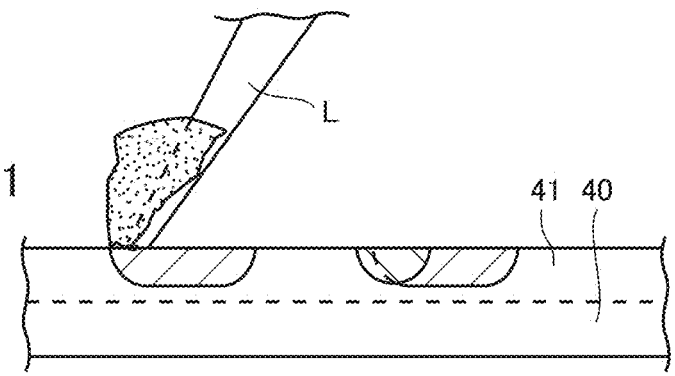
FIG. 21 is a cross-sectional view taken along line XXI-XXI in FIG. 20.

FIG. 20 is a plan view showing a step after the step shown in FIG. 18, and FIG. 21 is a cross-sectional view taken along line XXI-XXI in FIG. 20.

As shown in these FIGS. 20 and 21, a position 58 irradiated with laser beam L is moved, and thereby, weld bead 13A2 can be formed.

The welding conditions for weld bead 13A2 are the same as the welding conditions for weld bead 13A1 and weld bead 13A2 can also be formed excellently.

A plurality of weld beads 13A1 and 13A2 described above are annularly formed on opening edge portion 47 of case body 40 and outer peripheral edge portion 49 of lid 41.

Figure 22:
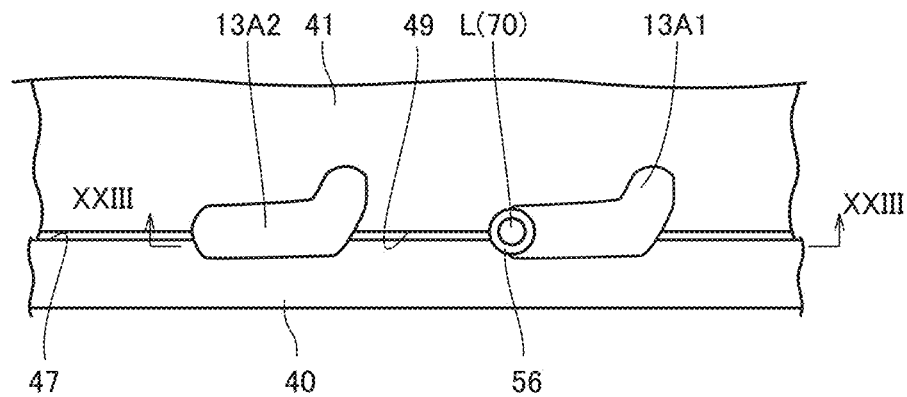
FIG. 22 is a plan view showing a step after the step of annularly forming a plurality of weld beads 13A on an opening edge portion 47 and an outer peripheral edge portion 49.
Figure 23:
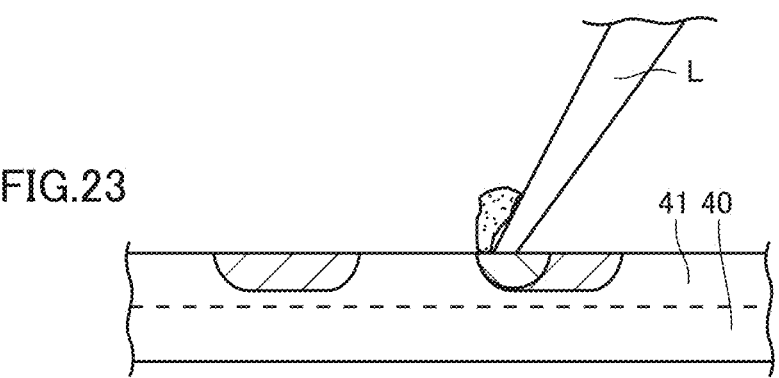
FIG. 23 is a cross-sectional view taken along line XXIII-XXIII shown in FIG. 22.

Next, second step P3-2 after first step P3-1 will be described. FIG. 22 is a plan view showing a step after a plurality of weld beads 13A are annularly formed on opening edge portion 47 and outer peripheral edge portion 49. FIG. 23 is a cross-sectional view taken along line XXIII-XXIII shown in FIG. 22. As shown in this FIG. 22, laser beam L is emitted to end portion 56 of weld bead 13A1. Namely, an initial position 70 of laser beam L is located on end portion 56.

At this time, as shown in FIG. 23, end portion 56 of weld bead 13A1 has been melted once and then naturally cooled and solidified. Therefore, by arranging initial position 70 of laser beam L as described above, the occurrence of poor welding is suppressed because this portion has already been welded even when sufficient heat energy is not supplied to the metal at the start of emission of laser beam L.

Furthermore, a timing of emitting laser beam L to end portion 56 of weld bead 13A1 is after weld bead 13A1 is formed and then a plurality of weld beads 13A are formed over the entire perimeters of opening edge portion 47 and outer peripheral edge portion 49. Therefore, the melted portion of weld bead 13A1 has already started to solidify, and thus, even when laser beam L is emitted to end portion 56 of weld bead 13A1, the occurrence of excessive melting is suppressed.

Fumes 53 generated during formation of weld bead 13A1 have already risen to an upper part and have already been diffused at the timing of emitting laser beam L to initial position 70, and thus, fumes 53 have not so much influence on laser beam L.

Specifically, the rising speed of fumes 53 does not vary depending on the processing speed of laser beam L and is 36 m/min. When the fumes rise to 60 mm, a concentration of the metal part particles and the like decreases and the fumes have not so much influence on laser beam L. On the other hand, a prescribed time elapses from when weld bead 13A1 is formed to when laser beam L is emitted to initial position 70. As a result, diffusion and the like of the laser beam by the fumes can be suppressed. The rising speed of fumes 53 can be measured by using a high-speed camera.

Figure 24:
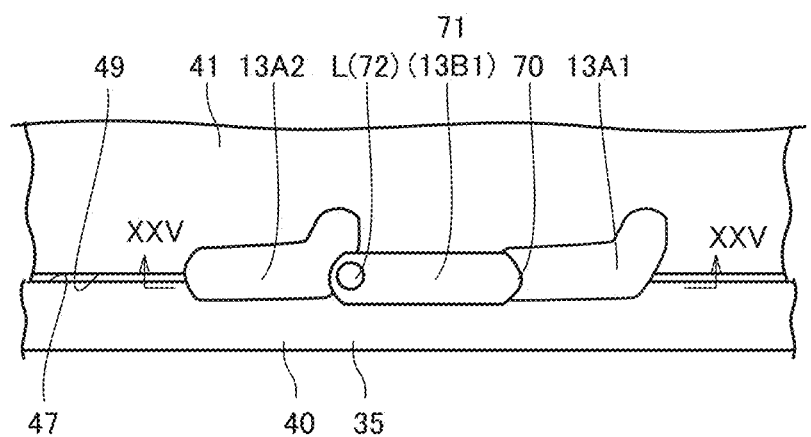
FIG. 24 is a plan view showing a step after the step shown in FIG. 22.
Figure 25:
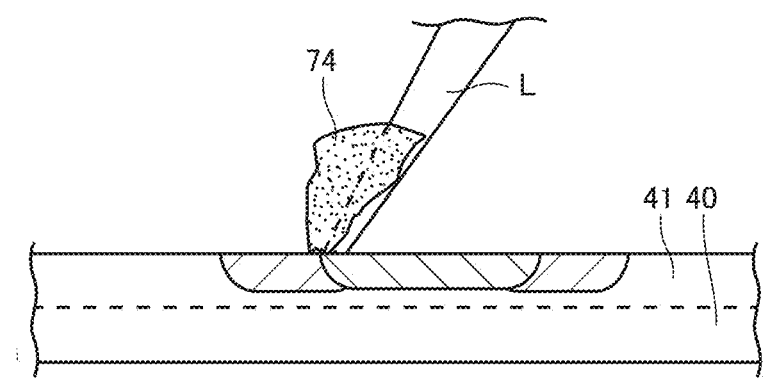
FIG. 25 is a cross-sectional view taken along line XXV-XXV shown in FIG. 24.

FIG. 24 is a plan view showing a step after the step shown in FIG. 22. FIG. 25 is a cross-sectional view taken along line XXV-XXV shown in FIG. 24. As shown in FIGS. 24 and 25, laser beam L is scanned to connect weld bead 13A1 and weld bead 13A2. The position irradiated with laser beam L is moved such that laser beam L passes on outer peripheral edge portion 49 of case body 40 and opening edge portion 47 of lid 41.

As a result, a melted portion 71 connecting weld bead 13A1 and weld bead 13A2 is formed. This melted portion 71 cools and solidifies, and a weld bead 13B1 is thus formed.

The length of weld bead 13B1 is set similarly to weld bead 13A1. As a result, in the process of forming weld bead 13B1 as well, generation of an excessive amount of fumes can be suppressed similarly to weld bead 13A1. Consequently, the occurrence of poor welding in formed weld bead 13B1 can be suppressed. In the example shown in FIG. 24, a gap portion located between weld beads 13A1 and 13A2 is closed by weld bead 13B1.

An irradiated position 72 shown in FIG. 24 is located on weld bead 13A2. Therefore, weld bead 13B1 formed by cooling of melted portion 71 is formed on weld bead 13A1 and weld bead 13A2.

Figure 26:
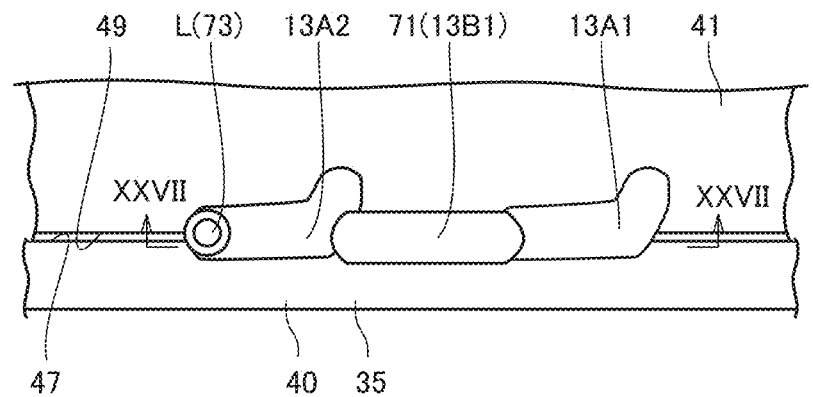
FIG. 26 is a plan view showing a step after the step shown in FIG. 24.
Figure 27:
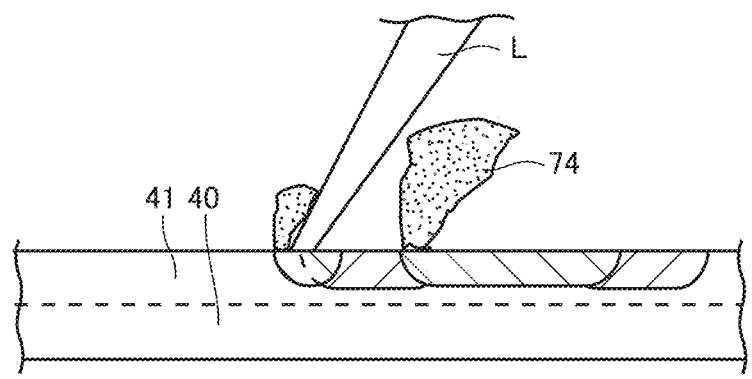
FIG. 27 is a cross-sectional view taken along line XXVII-XXVII in FIG. 26.

FIG. 26 is a plan view showing a step after the step shown in FIG. 24, and FIG. 27 is a cross-sectional view taken along line XXVII-XXVII in FIG. 26.

As shown in this FIG. 26, after melted portion 71 that will form weld bead 13B1 is formed, the position irradiated with laser beam L is moved to an initial position 73.

Most of weld bead 13A2 is located between irradiated position 72 shown in FIG. 24 and initial position 73 shown in FIG. 26, and a distance between irradiated position 72 and initial position 73 is equal to or longer than 2 mm. By adjusting the length of weld bead 13A1, the distance between irradiated position 72 and initial position 73 is preferably set to be equal to or greater than 60% of the length of weld bead 13B1.

By setting the distance between irradiated position 72 and initial position 73 as described above, laser beam L can be emitted to initial position 73 with almost no influence of fumes 74 generated during formation of weld bead 13B1.

Figure 28:
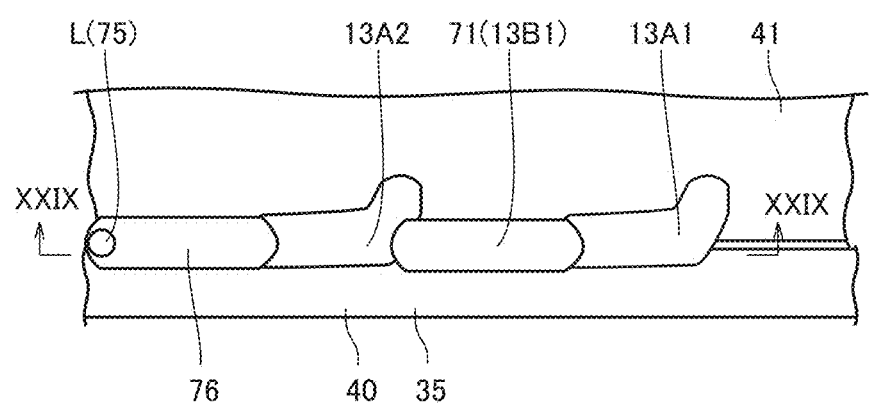
FIG. 28 is a plan view showing a step after the step shown in FIG. 26.
Figure 29:
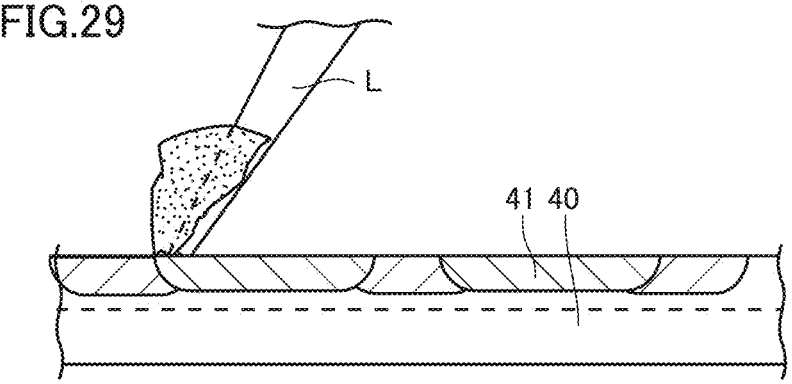
FIG. 29 is a cross-sectional view taken along line XXIX-XXIX in FIG. 28.

FIG. 28 is a plan view showing a step after the step shown in FIG. 26, and FIG. 29 is a cross-sectional view taken along line XXIX-XXIX in FIG. 28.

As shown in this FIG. 28, laser beam L is scanned to an irradiated position 75, and thereby, a melted portion 76 is formed on opening edge portion 47 and outer peripheral edge portion 49. The welding conditions for forming a weld bead 13B2 are the same as the welding conditions for forming weld bead 13B1. Therefore, weld bead 13B2 can also be formed excellently.

Weld beads 13B described above are sequentially formed in the gap portions located between weld beads 13A, and thereby, welded portion 12 shown in FIGS. 1 and 3 can be formed.

As described above, in the present embodiment, the plurality of first weld beads are formed to be spaced apart from one another, and thereafter, the second weld bead is formed in the gap portion located between the first weld beads, to thereby form welded portion 12. As a result, the influence of the fumes on the laser beam at the time of formation of each weld bead can be reduced.

Figure 30:
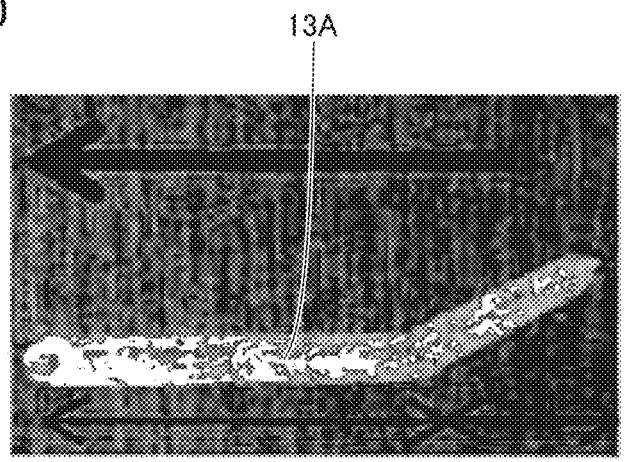
FIG. 30 is a photograph showing a state in which weld bead 13A has been formed.
Figure 31:
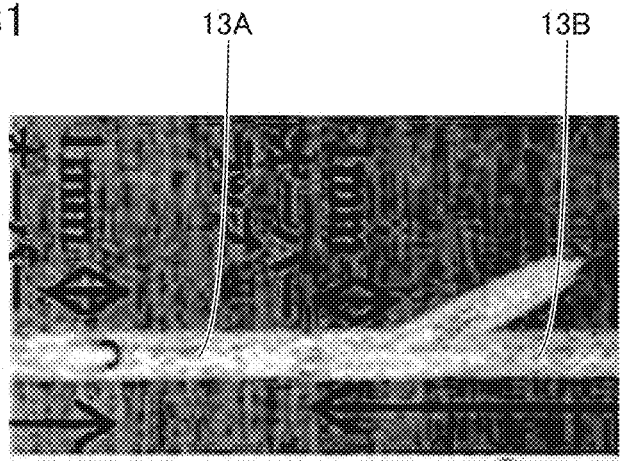
FIG. 31 is a photograph showing a state in which weld bead 13B has been formed to connect weld beads 13A.

FIG. 30 is a photograph showing a state in which weld bead 13A has been formed, and FIG. 31 is a photograph showing a state in which weld bead 13B has been formed to connect weld beads 13A.

In this way, welding step P3 shown in FIG. 6 is completed. Case body 40 and lid 41 are welded as described above, and thereby, housing case 3 including lid 11, case body 10 and welded portion 12 is formed as shown in FIG. 1. When welding step P3 is completed, closing member 81 shown in FIG. 1 is not yet formed.

Then, in injection step P4 shown in FIG. 6, an electrolyte is injected into housing case 3 from injection port 80 of lid 11. Then, in sealing step P5, injection port 80 is closed by closing member 81. Sealed battery 1 according to the first embodiment can thus be manufactured.

As described above, according to the method of manufacturing sealed battery 1 of the first embodiment, welded portion 12 can be formed excellently and the sealing property of housing case 3 can be ensured.

Second Embodiment

A method of manufacturing sealed battery 1 according to a second embodiment will be described with reference to FIGS. 32 to 35.

Figure 32:
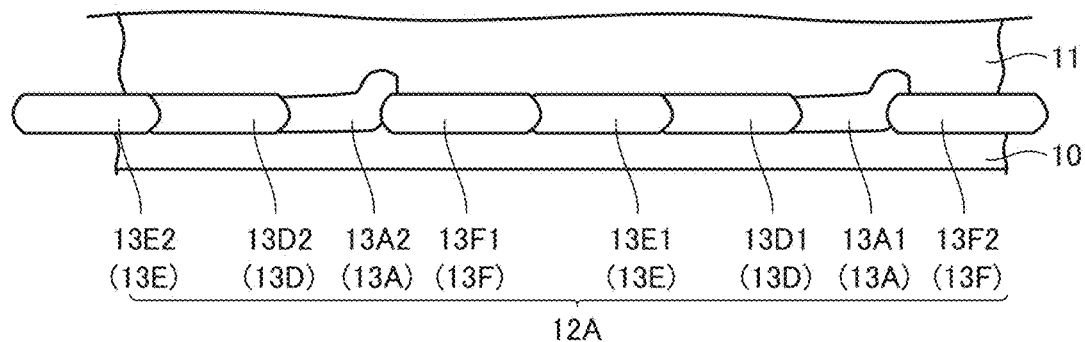
FIG. 32 is a plan view showing a welded portion 12A formed at a boundary portion between case body 10 and lid 11 of sealed battery 1 according to a second embodiment.

FIG. 32 is a plan view showing a welded portion 12A formed in a boundary portion between case body 10 and lid 11 of sealed battery 1 according to the second embodiment. As shown in this FIG. 32, welded portion 12A includes weld bead 13A1 and weld bead 13A2 formed to be spaced apart from each other, weld beads 13D1 and 13D2, weld beads 13E1 and 13E2, and weld beads 13F1 and 13F2.

Specifically, weld beads 13A are annularly formed in the boundary portion between case body 10 and lid 11 to be spaced apart from one another, and a plurality of weld beads 13D, 13E and 13F are formed between adjacent weld beads 13A. Weld beads 13A, 13D, 13E, and 13F are formed to be connected to one another.

In the example shown in FIG. 32 as well, opposing ends of weld bead 13A1 are covered with weld bead 13D1 and weld bead 13F2. Similarly, opposing ends of weld bead 13A2 are covered with weld beads 13F1 and 13D2 located adjacent to weld bead 13A2.

In the second embodiment, forming welded portion 12A includes first step P3-1 of annularly forming a plurality of weld beads 13A1 and 13A2 to be spaced apart from one another, and second step P3-2 of sequentially forming weld bead 13D in each gap portion located between weld beads 13A1 and 13A2. Second step P3-2 of forming weld beads 13E and 13F is repeated until the aforementioned gap portion is filled with the weld beads.

A welding step according to the second embodiment will now be described with reference to FIG. 33 and the like.

Figure 33:
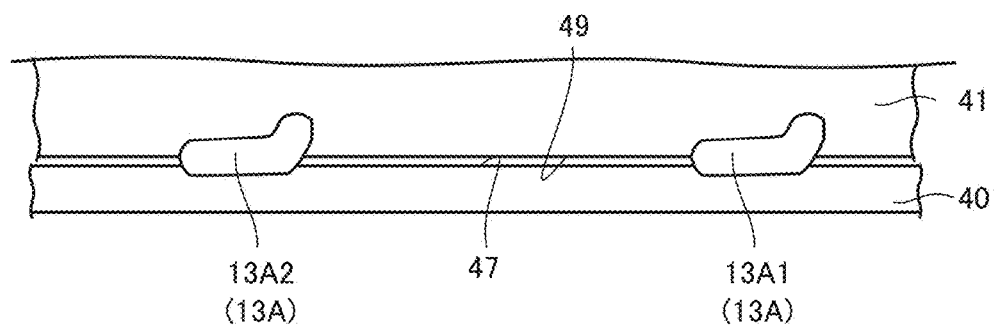
FIG. 33 is a plan view showing a first step of welded portion 12A.

FIG. 33 is a plan view showing first step P3-1 of welded portion 12A. As shown in this FIG. 33, a plurality of weld beads 13A1 and 13A2 are formed to be spaced apart from each other.

At this time, a distance between weld beads 13A1 and 13A2 is equal to or longer than 2 mm. Therefore, when weld bead 13A2 is formed, the influence of the fumes generated during formation of weld bead 13A1 is suppressed.

Figure 34:
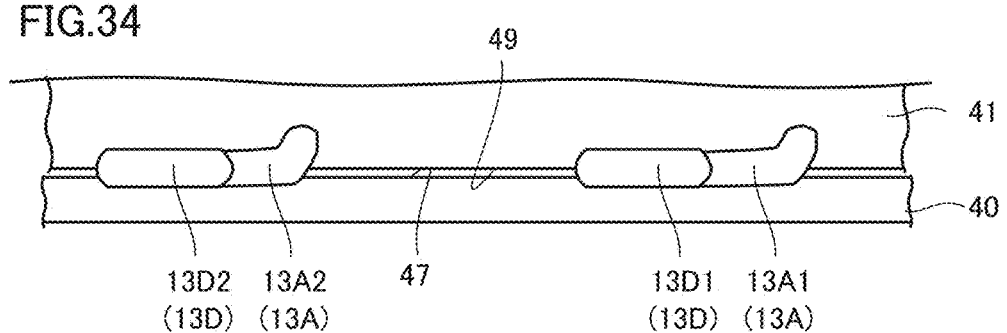
FIG. 34 is a plan view showing a step after the step shown in FIG. 33.

FIG. 34 is a plan view showing a step after the step shown in FIG. 33. As shown in this FIG. 34, weld bead 13D1 is formed between weld bead 13A1 and weld bead 13A2, and thereafter, weld bead 13D2 is formed between weld bead 13A2 and not-shown weld bead 13A. Weld beads 13D1 and 13D2 are formed to overlap with ends of weld beads 13A1 and 13A2 on the front side in the processing direction. When weld beads 13D1 and 13D2 are formed, a prescribed time has already elapsed since weld beads 13A1 and 13A2 were formed. Therefore, diffusion and the like of the laser beam by the fumes at the time of formation of weld beads 13D1 and 13D2 are suppressed.

Figure 35:
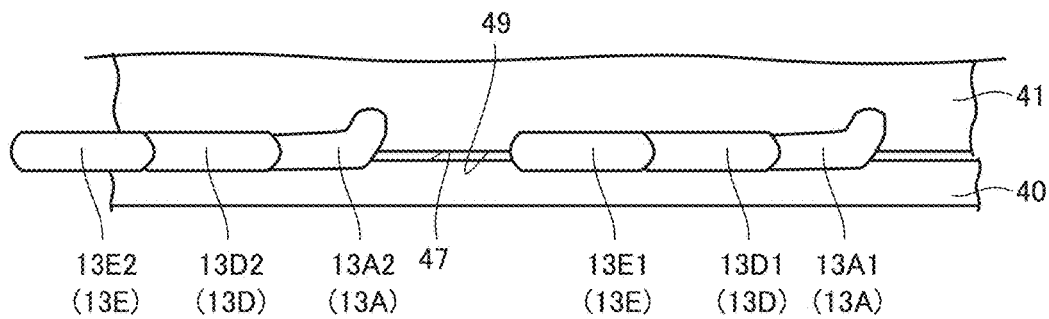
FIG. 35 is a plan view showing a step after the step shown in FIG. 34.

Next, as shown in FIG. 35, weld bead 13E1 is formed in a gap portion located between weld bead 13A1 and weld bead 13A2, and thereafter, weld bead 13E2 is formed in a gap portion located between weld bead 13A2 and not-shown weld bead 13A.

Next, in FIG. 32, weld bead 13F1 is formed in the gap portion located between weld bead 13A1 and weld bead 13A2. Then, weld bead 13F is sequentially formed in each gap portion, and finally, weld bead 13F2 is formed in a gap portion located between weld bead 13A1 and not-shown weld bead 13A. Welded portion 12A shown in FIG. 32 can thus be formed. In above-described sealed battery 1 as well, welded portion 12 can be formed excellently.

In the present embodiment, weld beads 13D, 13E and 13F located between weld beads 13A are formed in the order of weld bead 13D, weld bead 13E and weld bead 13F. However, weld beads 13D, 13E and 13F do not necessarily need to be formed in the aforementioned order.

For example, after forming a plurality of weld beads 13A to be spaced apart from one another, weld beads 13D and 13E arranged at positions apart from already-formed weld beads 13A may be formed.

For example, when weld bead 13A is formed and thereafter weld bead 13E is formed, a start position irradiated with laser beam L is preferably located on the upper surface of lid 41 or on the upper surface of case body 40. When weld bead 13A is formed and thereafter weld bead 13E is formed, a start point of weld bead 13E does not overlap with weld bead 13A.

If the start point of weld bead 13E is located on outer peripheral edge portion 49 and opening edge portion 47, a sufficient amount of melted metal may not be formed at the start position irradiated with laser beam L. When the amount of melted metal is small, opening edge portion 47 and outer peripheral edge portion 49 may not be strongly welded.

Thus, when weld bead 13A is formed and thereafter weld bead 13E is formed, the start position irradiated with laser beam L may be located on the upper surface of case body 40 or on the upper surface of lid 41.

It is not essential to position the start position irradiated with laser beam L on the upper surface of lid 41 or on the upper surface of case body 40 when weld bead 13A is formed and thereafter weld bead 13E is formed. This is because a negative effect in appearance such as a reduction in welding width is less likely to occur even when the start position irradiated with laser beam L is arranged on opening edge portion 47 and outer peripheral edge portion 49 as described above.

On the other hand, when the start position irradiated with laser beam L is arranged on opening edge portion 47 and outer peripheral edge portion 49, the time for scanning laser beam L on the upper surface of lid 41 or on the upper surface of case body 40 can be omitted, and thus, the processing time can be shortened.

Third Embodiment

In the first and second embodiments described above, description has been given to the example in which weld bead 13A and weld bead 13B or weld beads 13A, 13D, 13E, and 13F are formed over the entire perimeters of outer peripheral surface 48 of lid 41 and opening edge portion 47 of case body 40. However, the disclosure is not limited to the above-described example.

Figure 36:
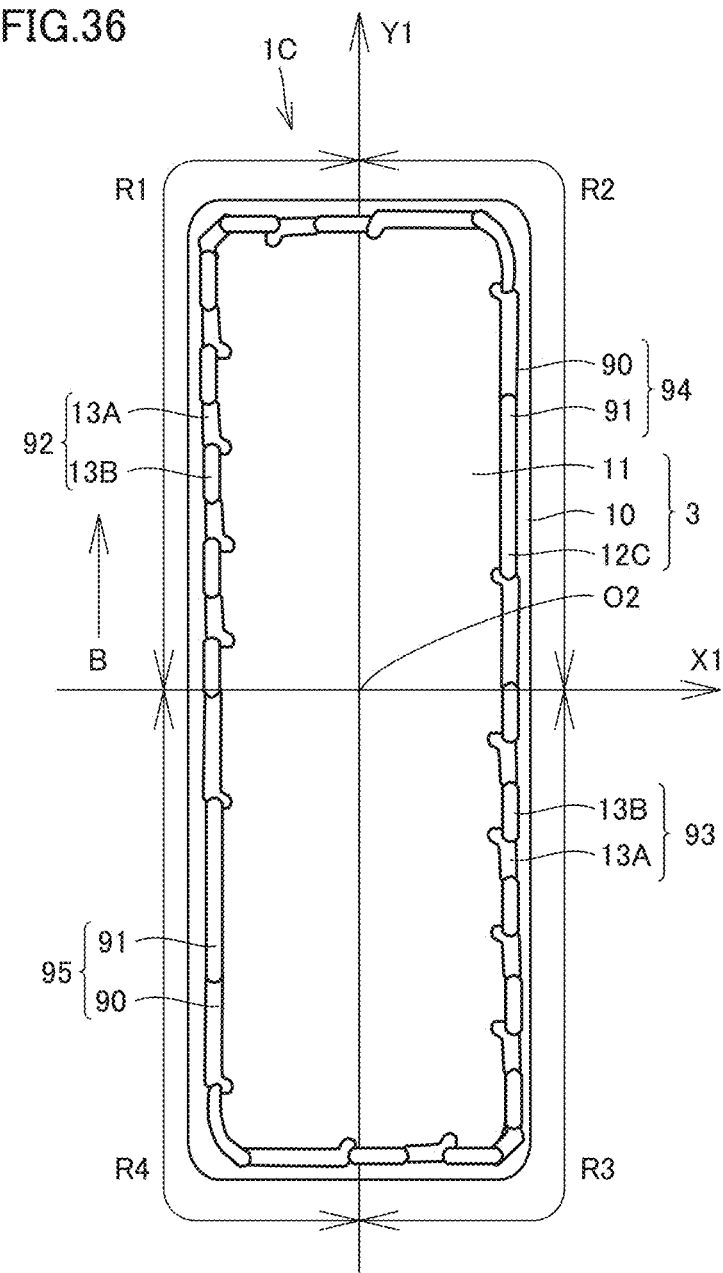
FIG. 36 is a plan view showing a sealed battery 1C according to a third embodiment.

FIG. 36 is a plan view showing a sealed battery 1C according to a third embodiment. As shown in this FIG. 36, housing case 3 of sealed battery 1C includes case body 10, lid 11 and a welded portion 12C.

Lid 11 is formed to have a rectangular shape, and includes a pair of longer side portions and a pair of shorter side portions. The center of lid 11 when lid 11 is viewed in a planar view from above lid 11 is defined as a center O2. An imaginary line passing through center O2 and passing through the center of each longer side portion of lid 11 is defined as an imaginary axis line X1. An imaginary line passing through center O2 and passing through the center of each shorter side portion of lid 11 is defined as an imaginary axis line Y1.

Welded portion 12C includes bead portions 92, 93, 94, and 95. Bead portion 92 and bead portion 93 are arranged to be symmetric with respect to center O2, and bead portion 94 and bead portion 95 are arranged to be symmetric with respect to center O2.

Bead portion 92 and bead portion 93 are formed by weld bead 13A and weld bead 13B, and bead portion 94 and bead portion 95 are formed by a weld bead 90 and a weld bead 91.

The lengths of weld beads 90 and 91 are longer than the lengths of weld beads 13A and 13B.

Figure 37:
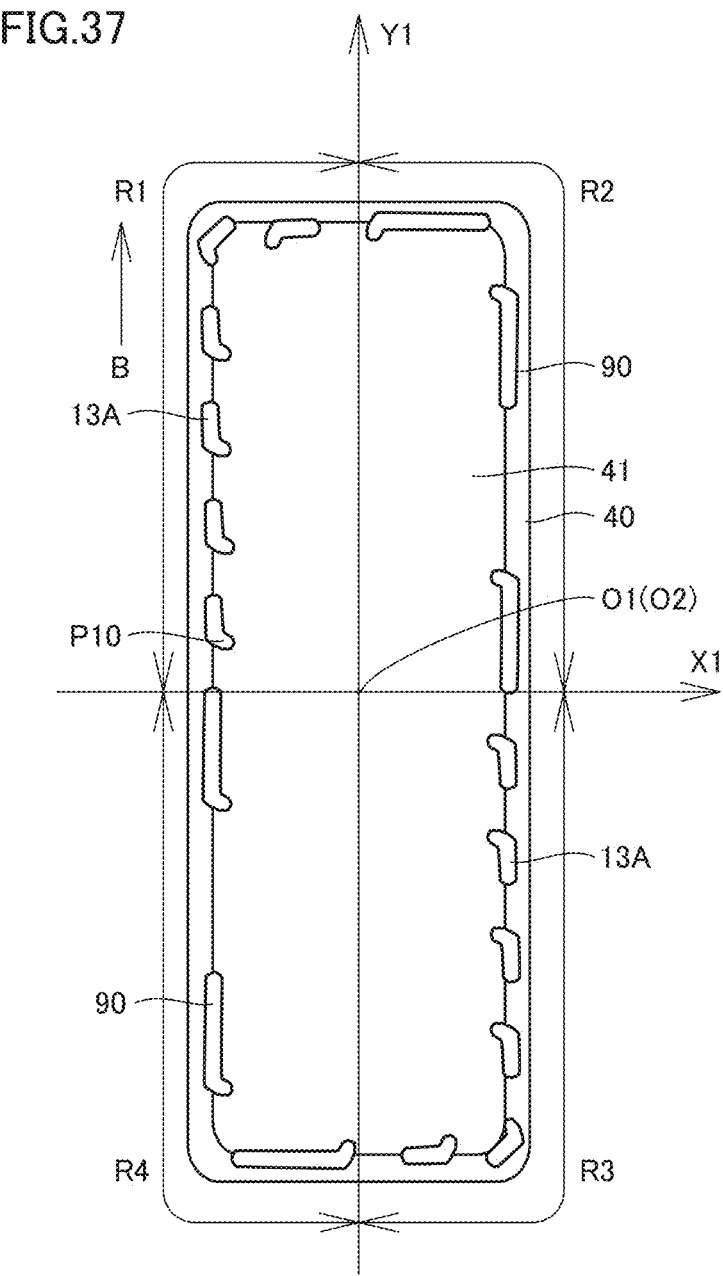
FIG. 37 is a plan view showing a first step P3-1 of welding step P3.

A method of manufacturing sealed battery 1C configured as mentioned above will be described. FIG. 37 is a plan view showing first step P3-1 of welding step P3.

In this FIG. 37, of a plurality of regions partitioned by imaginary axis line X1 and imaginary axis line Y1 with center O2 being an origin, a region in which imaginary axis line X1 is negative and imaginary axis line Y1 is positive is defined as a region R1. A region in which imaginary axis line X1 is positive and imaginary axis line Y1 is positive is defined as a region R2. A region in which imaginary axis line X1 is positive and imaginary axis line Y1 is negative is defined as a region R3. A region in which imaginary axis line X1 is negative and imaginary axis line Y1 is also negative is defined as a region R4.

Laser welding device 60 is arranged such that an origin O1 of laser welding device 60 matches with center O2 of lid 41. When laser beam L is emitted to origin O1, laser beam L enters lid 41 perpendicularly.

Thereafter, the laser beam is emitted to a processing start position P10 and a plurality of weld beads 13A are formed in a processing direction B to be spaced apart from one another. Then, when the laser beam enters region R2, a plurality of weld beads 90 are formed to be spaced apart from one another. Then, when the laser beam enters region R3, a plurality of weld beads 13A are formed to be spaced apart from one another. Then, when the laser beam enters region R4, a plurality of weld beads 90 are formed to be spaced apart from one another.

Figure 38:
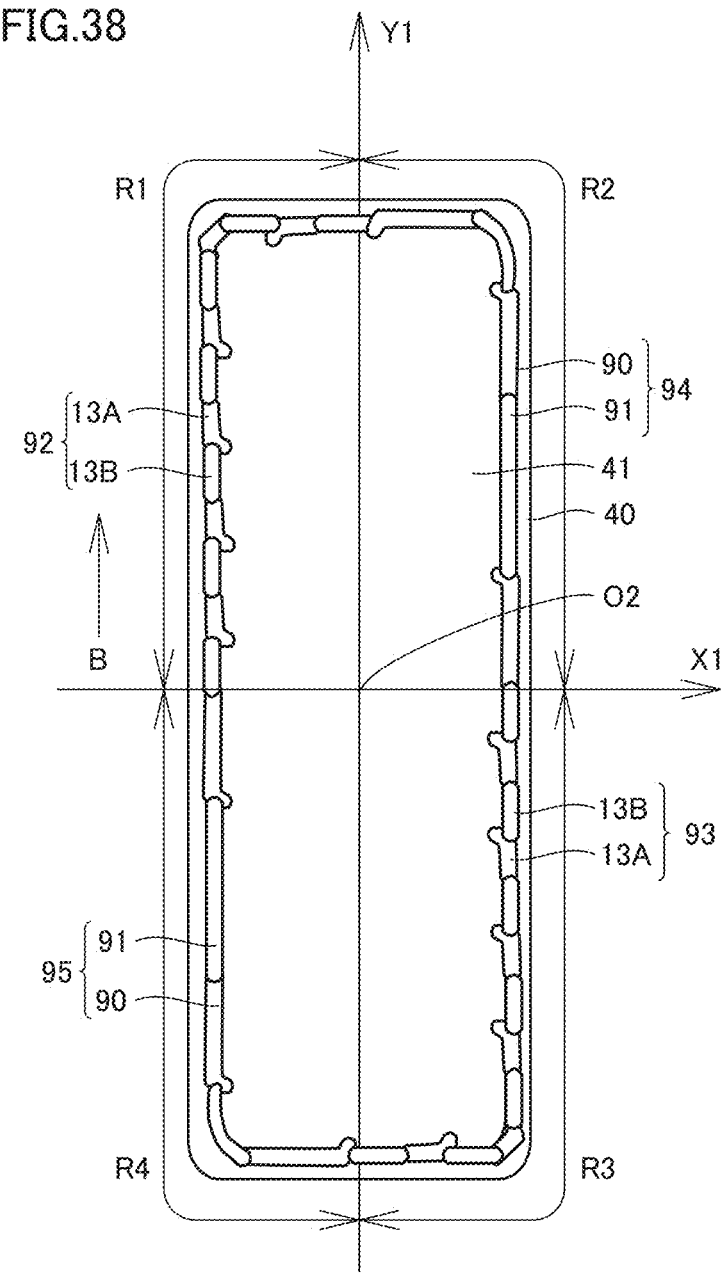
FIG. 38 is a plan view showing a second step P3-2.

FIG. 38 is a plan view showing second step P3-2. As shown in this FIG. 38, weld beads 13B are first formed in region R1. Next, when the laser beam enters region R2, weld bead 91 is formed between adjacent weld beads 90. Next, when the laser beam enters region R3, weld beads 13B are formed. Next, when the laser beam enters region R4, weld bead 91 is formed between adjacent weld beads 90.

Figure 39:
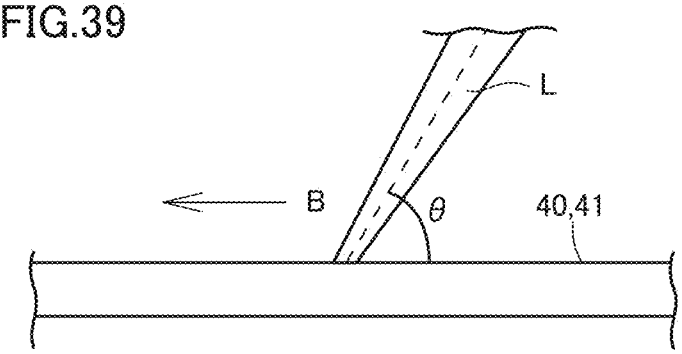
FIG. 39 is a side view schematically showing a manner of forming weld bead 13A or weld bead 13B in regions R1 and R3.

FIG. 39 is a side view schematically showing a manner of forming weld bead 13A or weld bead 13B in regions R1 and R3. An angle formed between an irradiation axis of laser beam L and the upper surface of case body 40 or lid 41 is defined as an irradiation angle θ. Irradiation angle θ is smaller than 90° when the incident direction of laser beam L is from the rear side in processing direction B with respect to the irradiated position. Irradiation angle θ is greater than 90° when the incident direction of laser beam L is from the front side in processing direction B with respect to the irradiated position.

As shown in FIGS. 39 and 37, when the laser beam is emitted to case body 40 and lid 41 in regions R1 and R3, irradiation angle θ is smaller than 90°. Therefore, when laser beam L moves in processing direction B, laser beam L is likely to interfere with the fumes. Thus, in order to suppress the influence of the fumes, weld bead 13A and weld bead 13B are formed in regions R1 and R3 as described in the first embodiment.

Figure 40:
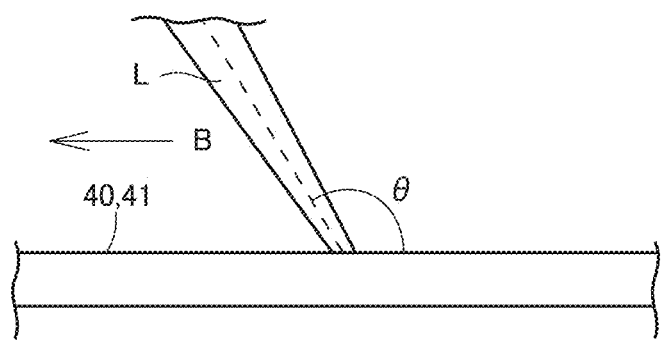
FIG. 40 is a side view schematically showing a manner of forming weld bead 90 or 91 in regions R2 and R4.

FIG. 40 is a side view schematically showing a manner of forming weld bead 90 or 91 in regions R2 and R4.

As shown in FIGS. 36 and 40, when laser beam L is emitted to case body 40 and lid 41 in regions R2 and R4, irradiation angle θ is equal to or greater than 90°. Therefore, when laser beam L moves in processing direction B, laser beam L moves away from the generated fumes. Thus, the fumes have not so much influence on laser beam L.

Therefore, even when the lengths of weld beads 90 and 91 in regions R2 and R4 are set to be longer than the lengths of weld beads 13A and 13B, the occurrence of poor welding in weld beads 90 and 91 can be suppressed.

As a matter of course, even when the opening edge portion of case body 40 and the outer peripheral edge portion of lid 41 located in regions R2 and R4 are welded by weld bead 13A and weld bead 13B, the excellent weld beads can be formed.

As described above, it is not essential to weld the entire perimeters of the opening edge portion of case body 40 and the outer peripheral edge portion of lid 41 by weld beads 13A and 13B.

Example

The present inventors conducted a verification test about the relevance between the length of the weld bead and poor welding. The verification test conducted by the present inventors will now be described.

Figure 41:
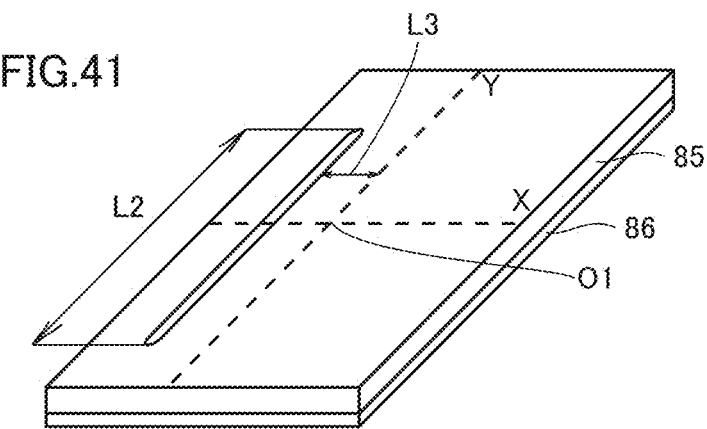
FIG. 41 is a perspective view showing a manner of a verification test.

FIG. 41 is a perspective view showing a manner of the verification test. In this FIG. 41, a test metal plate 85 was arranged on an upper surface of a spacer 86, and by using laser welding device 60, a laser beam was scanned on an upper surface of test metal plate 85 to examine a welding state.

Test metal plate 85 was made of an aluminum alloy having manganese added thereto, e.g., A3003, and had a thickness of 1.4 mm. Spacer 86 contained Al at a ratio equal to or higher than 99.5% and was made of so-called pure aluminum. A1050 was, for example, used as spacer 86. Spacer 86 had a thickness of, for example, 0.6 mm.

"X" in the figure indicates "galvano X axis", "Y" indicates "galvano Y axis", and "O1" indicates "origin O1".

The scanning direction of the laser beam was parallel to the galvano Y axis. A processing length L2 was 80 mm and a distance L3 from the galvano Y axis was 6.25 mm. The center of the position subjected to laser scanning passed through the galvano X axis.

Figure 42:
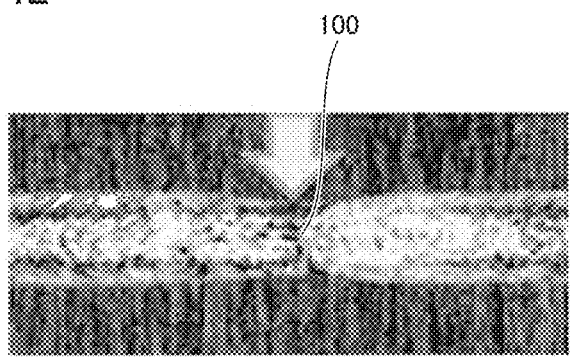
FIG. 42 is a photograph showing a state in which a decrease in melting has occurred.

Verification was conducted about three patterns of the processing speeds of the laser beam, i.e., 9 m/min, 21 m/min and 33 m/min. In each processing speed, an output was adjusted to achieve a penetration depth of 0.6 mm. In each processing speed, laser scanning was performed thirty times and a welding state of each weld bead was examined for each section of 1 mm. Namely, 30 weld beads were formed for each of the three types of processing speeds and a total of 90 weld beads were formed, and a welding state of each weld bead was examined for each section of 1 mm. Specifically, verification was conducted about whether or not a decrease in melting occurred. FIG. 42 is a photograph showing a state in which a decrease in melting has occurred. In FIG. 42, a portion shown by "100" corresponds to a portion where a decrease in melting has occurred.

TABLE 1

| | Section | Start (mm) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 78 | 79 |
|---|---|---|---|---|---|---|---|---|---|---|---|---|---|---|---|---|---|---|---|---|---|---|---|---|---|---|
| | | End (mm) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 79 | 80 |
| Processing speed | 9 m/min | | 0 | 0 | 0 | 0 | 0 | 0 | 0 | 0 | 1 | 6 | 9 | 1 | 1 | 7 | 8 | 3 | 4 | 8 | 2 | 7 | 8 | 3 | 10 | 5 |
| | 21 m/min | | 0 | 0 | 0 | 0 | 0 | 0 | 0 | 0 | 0 | 0 | 2 | 7 | 6 | 5 | 9 | 8 | 8 | 9 | 9 | 1 | 5 | 3 | 6 | 4 |
| | 33 m/min | | 0 | 0 | 0 | 0 | 0 | 0 | 0 | 0 | 0 | 0 | 0 | 0 | 1 | 6 | 5 | 5 | 4 | 8 | 5 | 9 | 5 | 8 | 4 | 10 |

The numerical values shown in Table 1 above indicate the number of weld beads having experienced poor melting in each section. For example, "6" in the section of "Start (mm)" of 9 mm and "End (mm)" of 10 mm when "Processing speed" is 9 m/min means that 6 out of 30 weld beads experienced poor welding in this section. As is also clear from Table 1 above, it can be seen that in the case of the processing speed being 9 m/min, a decrease in melting does not occur when the weld bead is longer than 0 mm and equal to or shorter than 8 mm. Furthermore, it can be seen that in the case of the processing speed being 21 m/min, a decrease in melting does not occur when the weld bead is longer than 0 mm and equal to or shorter than 10 mm. Moreover, it can be seen that in the case of the processing speed being 33 m/min, a decrease in melting does not occur when the weld bead is longer than 0 mm and equal to or shorter than 12 mm.

Namely, it can be seen that when the weld bead is longer than 0 mm and equal to or shorter than 8 mm, the weld bead having a sufficient melting width can be formed in the case of any processing speed.

On the other hand, according to the present inventors' findings, the manner of emission of the laser beam becomes a pulsed manner and a sufficient welding depth cannot be ensured when the weld bead is shorter than 2 mm.

As described above, it can be seen that when the length of the weld bead is set to be within a range of equal to or longer than 2 mm and equal to or shorter than 12 mm and the lengths of the first weld bead and the second weld bead are set to be within a range of longer than 8 mm and equal to or shorter than 12 mm, the lengths of the weld beads are set to become shorter as the processing speed becomes lower, and thereby, the excellent weld beads can be formed.

Next, the result of outer appearance observation of the formed weld bead in various manners of emission of the laser beam will be described together with Comparative Examples.

"Excellent bead outer appearance" in Table 2 above indicates the number of the welded portions determined as having excellent outer appearance when determined based on whether or not a welded portion (weld beads) is uniform over the entire perimeter. The welded portion is formed by a plurality of weld beads.

In Comparative Example 1, the laser beam was emitted continuously and "lid approach running" was not performed. The processing speed was 9 m/min. As a result of observation of the weld beads formed in this Comparative Example 1, 10 out of 30 weld beads were excellent.

In Comparative Example 2, the laser beam was emitted to the upper surface of the lid in an initial section of 0.5 mm, and thereafter, the laser beam was emitted to the outer peripheral edge portion of the lid and the opening edge portion of the case body in a section of 0.5 mm. Thereafter, with an interval of 1 mm, similar laser beam emission was again performed to complete one round. Then, in the second round, the laser beam was emitted to the section of 1 mm

TABLE 2

| | Laser beam emission interval (mm) | Presence or absence of lid approach running | Processing speed (m/min) | Excellent bead outer appearance | Notes |
|---|---|---|---|---|---|
| Comparative Example 1 | CW | absent | 9 | 10/30 | |
| Comparative Example 2 | 1 mm (in the first round, lid approach running was 0.5 mm) | present | 9 | 28/30 | estimate that the laser beam was emitted in a pulsed manner and spot-like weld beads were formed continuously, such that penetration became unstable |
| Comparative Example 3 | 10 mm (in the first round, lid approach running was 2 mm) | present | 9 | 17/30 | |
| Comparative Example 4 | 1 set was 0.8 mm (overlap was 0.2 mm) | absent | 9 | 10/30 | irradiation method described in Japanese Patent Laying-Open No. 2009-245758 |
| Example 1 | 6 mm (in the first round, lid approach running was 2 mm) | present | 9 | 30/30 | |
| Example 2 | 6 mm | absent | 9 | 30/30 | decrease in melting did not occur even in the absence of lid approach running |
| Comparative Example 5 | CW | absent | 21 | 12/30 | |
| Example 3 | 5 mm (in the first round, lid approach running was 2 mm) | present | 21 | 30/30 | |
| Comparative Example 6 | CW | absent | 33 | 15/30 | |
| Example 4 | 4 mm (in the first round, lid approach running was 2 mm) | present | 33 | 30/30 | |

In Table 2 above, 30 weld beads were formed under the respective conditions in Comparative Examples 1 to 6 and Examples 1 to 4.

"Presence or absence of lid approach running" in Table 2 above means that the initial irradiated position is located on lid 41 at the time of emission of the laser beam as shown in FIGS. 12 and 14.

between the weld beads formed in the first round. The processing speed during each laser beam emission was 9 m/min.

As a result of observation of the weld beads formed in this Comparative Example 2, 28 out of 30 weld beads were excellent. As a reason why the weld beads having a poor outer appearance were formed, the present inventors estimate that the emitted laser beam became a pulsed laser beam and spot-like weld beads were formed continuously, such that the penetration depth of each weld bead became insufficient.

In Comparative Example 3, the laser beam was emitted to the upper surface of the lid in a section of 2 mm, and thereafter, the laser beam was emitted to the outer peripheral edge portion of the lid and the opening edge portion of the housing case in a section of 8 mm. Thereafter, with an interval of 10 mm, similar laser beam emission was repeated to complete one round. Then, in the second round, the laser beam was emitted to the section of 10 mm between the weld beads formed in the first round. The processing speed during each laser beam emission was 9 m/min. As a result of observation of the weld beads formed in Comparative Example 3, 17 out of 30 weld beads were excellent.

In Comparative Example 4, laser beam emission to a section of 0.8 mm, and then, return by 0.2 mm and laser beam emission to a section of 0.8 mm again were repeated a plurality of times. In this Comparative Example 4, there was an overlap of 0.2 mm, and thus, a processing distance traveled by one emission was 0.6 mm. The processing speed during each laser beam emission was 9 m/min.

As a result of observation of the weld beads formed in Comparative Example 4, 10 out of 30 weld beads were excellent.

In Example 1, laser beam emission to a section of 6 mm in the laser scanning direction, and thereafter, with an interval of 6 mm, laser beam emission to a section of 6 mm in the laser scanning direction again were repeated in the first round. In addition, in the first round, the initial position irradiated with the laser beam was located on the upper surface of the lid and the laser beam was scanned on the upper surface of the lid in a section of 2 mm from the start of emission. In the remaining section of 4 mm, the laser beam was scanned on the portion to be welded. In the second round, the laser beam was emitted to the section of 6 mm between the weld beads formed in the first round, so as to connect the weld beads formed in the first round. In any of the first round and the second round, the processing speed during laser beam emission was 9 m/min.

As a result of observation of the weld beads formed in Example 1, 30 out of 30 weld beads were excellent.

In Example 2, "lid approach running" in the first round in Example 1 described above was not performed and the remaining conditions were the same as those of Example 1. As a result of observation of the weld beads formed in Example 2, 30 out of 30 weld beads were excellent.

Namely, it can be seen that even when the initial position irradiated with the laser beam is not arranged on the upper surface of the lid in the first round, the outer appearance of the welded portion is not greatly affected.

In Comparative Example 5, the laser beam was emitted continuously and "lid approach running" was not performed. The processing speed during laser beam emission was 21 m/min.

As a result of observation of the weld beads formed in Comparative Example 5, 12 out of 30 weld beads were excellent.

In Example 3, laser beam emission to a section of 5 mm in the laser scanning direction, and thereafter, with an interval of 5 mm, laser beam emission to a section of 5 mm in the laser scanning direction again were repeated in the first round. In addition, in the first round, the initial position irradiated with the laser beam was located on the upper surface of the lid and the laser beam was scanned on the upper surface of the lid in a section of 2 mm from the start of emission. In the remaining section of 3 mm, the laser beam was scanned on the portion to be welded. In the second round, the laser beam was emitted to the section of 5 mm between the weld beads formed in the first round, so as to connect the weld beads formed in the first round. In any of the first round and the second round, the processing speed during laser beam emission was 21 m/min.

As a result of observation of the weld beads formed in Example 3, 30 out of 30 weld beads were excellent.

In Comparative Example 6, the laser beam was emitted continuously and "lid approach running" was not performed. The processing speed during laser beam emission was 33 m/min.

As a result of observation of the weld beads formed in Comparative Example 6, 15 out of 30 weld beads were excellent.

In Example 4, laser beam emission to a section of 4 mm in the laser scanning direction, and thereafter, with an interval of 4 mm, laser beam emission to a section of 4 mm in the laser scanning direction again were repeated in the first round. In addition, in the first round, the initial position irradiated with the laser beam was located on the upper surface of the lid and the laser beam was scanned on the upper surface of the lid in a section of 2 mm from the start of emission. In the remaining section of 2 mm, the laser beam was scanned on the portion to be welded. In the second round, the laser beam was emitted to the section of 4 mm between the weld beads formed in the first round, so as to connect the weld beads formed in the first round. In any of the first round and the second round, the processing speed during laser beam emission was 33 m/min. As a result of observation of the weld beads formed in Example 4, 30 out of 30 weld beads were excellent.

As is also clear from Comparative Examples 1, 5 and 6, it can be seen that the excellent welded portion cannot, in some cases, be obtained regardless of the processing speed, when processing is performed by continuous emission of the laser beam.

In addition, as is also clear from Comparative Examples 2 and 3, it can be seen that even in the case of forming the weld beads to be spaced apart from one another, the excellent weld beads cannot, in some cases, be obtained when the formed weld beads are too long or too short.

Furthermore, it can be seen that the excellent welded portion cannot, in some cases, be obtained even when the portion irradiated with the laser beam is partially overlapped as in Comparative Example 4.

On the other hand, it can be seen that the excellent welded portion can be formed regardless of the processing speed, when the weld bead is equal to or longer than 2 mm and equal to or shorter than 8 mm and the distance between the weld beads is equal to or longer than 2 mm as described in Examples 1 to 4. Next, the processing time required when various types of objects to be processed are welded at various processing speeds will be described together with Comparative Example.

Tables 3 and 4 below show the processing time required when welding is performed at respective processing speeds in the housing case of sealed battery 1 having a certain size.

The size of the housing case of the sealed battery used in Table 3 is smaller than that of the housing case of the sealed battery used in Table 4.

TABLE 3

| Processing speed (m/min) | Comparative Example (processing time) | Example (processing time) |
|---|---|---|
| 9 | 2.4 | 3.6 |
| 21 | 1.0 | 1.6 |
| 33 | 0.7 | 1.0 |

TABLE 4

| Processing speed (m/min) | Comparative Example (processing time) | Example (processing time) |
|---|---|---|
| 21 | 0.9 | 1.4 |
| 33 | 0.6 | 0.9 |

In Comparative Example in Tables 3 and 4, the laser beam is emitted continuously to form a welded portion. In Example, weld beads each having a length of equal to or longer than 2 mm and equal to or shorter than 8 mm are formed to be spaced apart from one another in the first round, and a weld bead is newly formed to fill a gap between the already-formed weld beads, to thereby form a welded portion. As is also clear from Tables 3 and 4 above, it can be seen that there is no great difference in processing time between Comparative Example and Example.

While the embodiments of the disclosure have been described above, the embodiments disclosed herein are illustrative and non-restrictive in every respect. The scope of the disclosure is defined by the terms of the claims, and is intended to include any modifications within the meaning and scope equivalent to the terms of the claims.

What is claimed is:

1. A method of manufacturing a sealed battery including a case formed by welding a lid and a case body having an opening with a laser beam, and an electrode body housed in the case, the method comprising:
arranging the lid in the opening of the case body; and
forming a welded portion connecting an opening edge portion of the case body and an outer peripheral edge portion of the lid,
forming the welded portion including:
sequentially forming a plurality of first weld beads in the opening edge portion and the outer peripheral edge portion such that the plurality of first weld beads are spaced apart from one another by a plurality of gap portions; and
forming a second weld bead in each gap portion of the plurality of gap portions located between the first weld beads, with the plurality of gap portions being formed in the opening edge portion and the outer peripheral edge portion, wherein
lengths of the first weld bead and the second weld bead are set to be within a range of equal to or longer than 2 mm and equal to or shorter than 12 mm,
a processing speed is equal to or more than 9 m/min and equal to or less than 33 m/min when lengths of the first weld bead and the second weld bead are set to be within a range of equal to or longer than 2 mm and equal to or shorter than 8 mm,
the processing speed is equal to or more than 21 m/min and equal to or less than 33 m/min when lengths of the first weld bead and the second weld bead are set to be longer than 8 mm and equal to or shorter than 10 mm,
the processing speed is 33 m/min when lengths of the first weld bead and the second weld bead are set to be longer than 10 mm and equal to or shorter than 12 mm,
the lid and case body is welded by the first weld bead and the second weld bead,
forming the second weld bead is repeatedly performed until each of the plurality of gap portions is filled with the second weld bead,
the laser beam is output from a laser welding device, and
the laser welding device forms the first weld bead by emitting the laser beam to a position on the case body apart from the opening edge portion or a position on the lid apart from the outer peripheral edge portion, and then, moving a position irradiated with the laser beam toward the opening edge portion and the outer peripheral edge portion, and moving the irradiated position on the opening edge portion and on the outer peripheral edge portion when the irradiated position reaches the opening edge portion and the outer peripheral edge portion.

* * * * *